(12) United States Patent
Ogawa et al.

(10) Patent No.: US 10,215,452 B2
(45) Date of Patent: Feb. 26, 2019

(54) AIR CONDITIONER

(71) Applicant: Mitsubishi Electric Corporation, Chiyoda-ku, Tokyo (JP)

(72) Inventors: Mizuki Ogawa, Tokyo (JP); Ryohei Takamatsu, Tokyo (JP); Koji Saito, Tokyo (JP); Masaru Imaizumi, Tokyo (JP); Yuji Motomura, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 81 days.

(21) Appl. No.: 15/314,022

(22) PCT Filed: Jun. 9, 2015

(86) PCT No.: PCT/JP2015/066600
§ 371 (c)(1),
(2) Date: Nov. 25, 2016

(87) PCT Pub. No.: WO2016/009748
PCT Pub. Date: Jan. 21, 2016

(65) Prior Publication Data
US 2017/0191706 A1 Jul. 6, 2017

(30) Foreign Application Priority Data

Jul. 18, 2014 (JP) .................................. 2014-147434

(51) Int. Cl.
*F25B 13/00* (2006.01)
*F25B 1/00* (2006.01)
(Continued)

(52) U.S. Cl.
CPC ............ *F25B 13/00* (2013.01); *F16K 11/076* (2013.01); *F24F 5/00* (2013.01); *F25B 1/00* (2013.01);
(Continued)

(58) Field of Classification Search
CPC .... F25B 13/00; F25B 49/02; F25B 2313/006; F25B 2313/0231; F25B 2313/0233;
(Continued)

(56) References Cited

U.S. PATENT DOCUMENTS 2,533,931 A 12/1950 Hartley
2,678,062 A 5/1954 MacNeill
(Continued)

FOREIGN PATENT DOCUMENTS

CN 1289031 A 3/2001
CN 102112815 A 6/2011
(Continued)

OTHER PUBLICATIONS

The extended European Search Report dated Jan. 19, 2018, by the European Patent Office in corresponding European Patent Application No. 15822339.6-1008. (9 pages).
(Continued)

*Primary Examiner* — Marc E Norman
(74) *Attorney, Agent, or Firm* — Buchanan Ingersoll & Rooney PC

(57) ABSTRACT

A heat-medium flow-path switching device and a heat-medium flow-rate adjusting device are integrated into an integrated heat-medium flow-rate adjusting device. The integrated heat-medium flow-rate adjusting device is configured to perform the heat-medium flow-path switching function and the meat-medium flow-rate adjusting function by driving and controlling a single drive unit. Moreover, the integrated heat-medium flow-path switching device is configured to perform a function of closing flow paths from/to a use-side heat exchanger added to the heat-medium flow-rate adjusting function.

9 Claims, 16 Drawing Sheets

(51) Int. Cl.
*F16K 11/076* (2006.01)
*F25B 29/00* (2006.01)
*F25B 41/04* (2006.01)
*F24F 5/00* (2006.01)
*F25B 47/00* (2006.01)
*F25B 49/02* (2006.01)

(52) U.S. Cl.
CPC ............. *F25B 29/00* (2013.01); *F25B 41/04* (2013.01); *F25B 47/003* (2013.01); *F25B 49/02* (2013.01); *F25B 2313/006* (2013.01); *F25B 2313/0231* (2013.01); *F25B 2313/0233* (2013.01); *F25B 2313/0272* (2013.01); *F25B 2313/02743* (2013.01); *F25B 2313/0314* (2013.01)

(58) Field of Classification Search
CPC .... F25B 2313/0272; F25B 2313/02743; F25B 2313/0314
See application file for complete search history.

(56) References Cited

U.S. PATENT DOCUMENTS

| | | |
|---|---|---|
| 3,021,869 A | 2/1962 | Ross |
| 3,098,506 A | 7/1963 | Spragens |
| 3,190,584 A | 6/1965 | Gire et al. |
| 3,199,539 A | 8/1965 | Leathem |
| 3,918,493 A | 11/1975 | Tobias |
| 4,055,151 A | 10/1977 | Cummings et al. |
| 4,345,622 A | 8/1982 | Henningsson |
| 4,355,659 A | 10/1982 | Kelchner |
| 4,445,540 A | 5/1984 | Baron et al. |
| 4,506,703 A | 3/1985 | Baron |
| 4,543,996 A | 10/1985 | Baron |
| 4,658,859 A | 4/1987 | Backe et al. |
| 4,716,923 A | 1/1988 | West |
| 4,986,307 A | 1/1991 | Hardee |
| 5,172,725 A | 12/1992 | Kitagawa |
| 5,820,133 A | 10/1998 | Altsuler |
| 5,868,165 A | 2/1999 | Tranovich |
| 6,308,739 B1 | 10/2001 | Barbuto et al. |
| 6,470,913 B1 | 10/2002 | Woodworth |
| 6,647,934 B2 | 11/2003 | Marsh et al. |
| 6,681,805 B2 | 1/2004 | McLane et al. |
| 6,994,316 B2 | 2/2006 | Pervaiz |
| 7,516,942 B2 | 4/2009 | Grau et al. |
| 7,690,397 B2 | 4/2010 | Hollis |
| 7,814,964 B2 | 10/2010 | Greer |
| 8,733,120 B2 | 5/2014 | Morimoto et al. |
| 8,813,783 B2 | 8/2014 | Morris |
| 8,905,076 B2 | 12/2014 | Jorgensen et al. |
| 9,435,447 B2 | 9/2016 | Wattellier et al. |
| 9,696,070 B2 | 7/2017 | Ohta |
| 2003/0196713 A1 | 10/2003 | Ma |
| 2004/0040315 A1 | 3/2004 | Koyama et al. |
| 2004/0173510 A1 | 9/2004 | Jung |
| 2004/0182455 A1 | 9/2004 | Wells et al. |
| 2007/0068667 A1 | 3/2007 | Greer |
| 2008/0302994 A1 | 12/2008 | Syzkulski |
| 2011/0126931 A1 | 6/2011 | Ide et al. |
| 2011/0192184 A1 | 8/2011 | Yamashita et al. |
| 2012/0006050 A1* | 1/2012 | Takayama ............... F24F 3/065 62/513 |
| 2012/0006436 A1 | 1/2012 | Morimoto et al. |
| 2012/0031130 A1 | 2/2012 | Morimoto et al. |
| 2012/0048411 A1 | 3/2012 | Steyer et al. |
| 2012/0180515 A1 | 7/2012 | Morimoto et al. |
| 2013/0134341 A1 | 5/2013 | Cheng |
| 2013/0174594 A1 | 7/2013 | Yamashita et al. |
| 2014/0182329 A1 | 7/2014 | Yamashita et al. |
| 2014/0290659 A1 | 10/2014 | Chen et al. |
| 2014/0373562 A1 | 12/2014 | Suzuki et al. |
| 2014/0374081 A1 | 12/2014 | Kakehashi et al. |
| 2015/0000327 A1 | 1/2015 | Kakehashi et al. |
| 2016/0003490 A1 | 1/2016 | Motomura et al. |
| 2017/0191574 A1 | 7/2017 | Takamatsu et al. |
| 2017/0191706 A1 | 7/2017 | Ogawa et al. |
| 2017/0254425 A1 | 9/2017 | Takamatsu et al. |

FOREIGN PATENT DOCUMENTS

| | | |
|---|---|---|
| CN | 102575880 A | 7/2012 |
| DE | 195 07 919 A1 | 9/1996 |
| DE | 10 2005 031 962 A1 | 1/2007 |
| EP | 1 087 188 A1 | 3/2001 |
| EP | 3 171 097 A1 | 5/2017 |
| FR | 2 656 668 A1 | 7/1991 |
| FR | 2 988 460 A1 | 9/2013 |
| GB | 821898 A | 10/1959 |
| GB | 2526486 A | 11/2015 |
| JP | S51-083932 U | 7/1976 |
| JP | S52-106642 U | 8/1977 |
| JP | S59-170572 A | 9/1984 |
| JP | S60-097598 U | 7/1985 |
| JP | 3049769 U | 6/1998 |
| JP | 2001-091078 A | 4/2001 |
| JP | 2007-309333 A | 11/2007 |
| JP | 2011-043188 A | 3/2011 |
| JP | 2013-230805 A | 11/2013 |
| WO | 2006/109639 A1 | 10/2006 |
| WO | WO 2010/049998 A1 | 5/2010 |
| WO | WO 2010/119555 A1 | 10/2010 |
| WO | 2010/137137 A1 | 12/2010 |
| WO | 2011/048724 A1 | 4/2011 |
| WO | WO 2012/070192 A1 | 5/2012 |
| WO | WO 2014/128961 A1 | 8/2014 |
| WO | WO 2014/128962 A1 | 8/2014 |

OTHER PUBLICATIONS

Office Action (Notification of Reasons for Refusal) dated Jan. 30, 2018, by the Japanese Patent Office in corresponding Japanese Patent Application No. 2016-534323, and an English Translation of the Office Action (6 pages).

Office Action (Notification of Reasons for Refusal) dated Aug. 1, 2017, by the Japanese Patent Office in corresponding Japanese Patent Application No. 2016-534323 and English translation of the Office Action. (11 pages).

International Search Report (PCT/ISA/210) dated Aug. 18, 2015, by the Japanese Patent Office as the International Searching Authority for International Application No. PCT/JP2015/066600.

Written Opinion (PCT/ISA/237) dated Aug. 18, 2015, by the Japanese Patent Office as the International Searching Authority for International Application No. PCT/JP2015/066600.

Office Action dated Jul. 20, 2018, by the Chinese Patent Office in corresponding Chinese Patent Application No. 201580033319.7 and English translation of the Office Action. (15 pages).

Office Action (First Notice of Reasons for Refusal) dated Mar. 20, 2018, by the State Intellectual Property Office (SIPO) of the People's Republic of China in Chinese Patent Application No. 201580022523.9 and an English Translation of the Office Action. (14 pages).

Office Action (The First Office Action) dated May 2, 2018, by the State Intellectual Property Office (SIPO) of the People's Republic of China in Chinese Patent Application No. 201580038942.1 and an English Translation of the Office Action. (14 pages).

The extended European Search Reporting dated Mar. 1, 2018, by the European Patent Office in European Patent Application No. 15821359.5-1015. (7 pages).

The extended European Search Reporting dated May 2, 2018, by the European Patent Office in European Patent Application No. 15833371.6-1015. (8 pages).

International Search Report (Form PCT/ISA/210) dated Aug. 25, 2015, by the Japanese Patent Office as the International Searching Authority for International Application No. PCT/JP2015/064986. (5 pages).

(56) References Cited

OTHER PUBLICATIONS

International Search Report (Form PCT/ISA/210) dated Sep. 8, 2015, by the Japanese Patent Office as the International Searching Authority for International Application No. PCT/JP2015/066601. (5 pages).
Office Action (Notification of Reason for Refusal) dated Apr. 18, 2017, by the Japanese Patent Office in Japanese Patent Application No. 2016-543844, and an English Translation of the Office Action. (7 pages).
Written Opinion (Form PCT/ISA/237) dated Aug. 25, 2015, by the Japanese Patent Office as the International Searching Authority for International Application No. PCT/JP2015/064986. (5 pages).
Written Opinion (Form PCT/ISA/237) dated Sep. 8, 2015, by the Japanese Patent Office as the International Searching Authority for International Application No. PCT/JP2015/066601. (6 pages).

* cited by examiner

AIR CONDITIONER

TECHNICAL FIELD

The present invention relates to air conditioners applied to, for example, multi-zone air conditioning systems used for buildings, and particularly to compactification thereof and reduction of their manufacturing costs by integrating a plurality of parts.

BACKGROUND ART

An air conditioning system such as a multi-zone air conditioning system for buildings is basically composed of one heat source unit, i.e., an outdoor unit and indoor units each provided in a plurality of spaces to be air-conditioned and connected to the outdoor unit, to control the temperature of each space to be air-conditioned. Conventionally, there has been an air conditioning system for cooling or heating interior spaces to be air-conditioned by circulating a refrigerant, such as hydrofluorocarbon (HFC), between the outdoor unit installed outside a building and the indoor units provided in the interior spaces of the building and by transferring, through the indoor units, heat from/to the refrigerant heated/cooled in the outdoor unit to/from the air in the interior spaces to be air-conditioned. In the system, the refrigerant might leak out in the spaces to be air-conditioned because of its structure adapted to circulate the refrigerant to the indoor units.

For that reason, there has been an air conditioning system in which a relay unit is provided between the outdoor unit and the indoor units to circulate a refrigerant from the outdoor unit to the relay unit and to circulate a heat medium, such as water, from the relay unit to the indoor units, and heat exchange is performed between the refrigerant and the heat medium through intermediate heat exchangers provided in the relay unit. The relay unit is further provided with heat-medium flow-path switching devices for sending the heat medium heated by one of the intermediate heat exchanger (hereinafter, referred to as a heating-use heat medium) to indoor units that are running in heating operations and for sending the heat medium cooled by the other intermediate heat exchangers (hereinafter, referred to as a cooling-use heat medium) to indoor units that are running in cooling operations. And the heated heat medium and the cooled heat medium are heat-exchanged, in the respective relevant indoor units, with the air in the interior spaces to be air-conditioned. Thus, a cooling operation or a heating operation can be performed for individual interior spaces to be air-conditioned (see, for example, Patent Document 1).

PRIOR ART DOCUMENT

Patent Document

Patent Document 1: WO2010/049998 A

SUMMARY OF THE INVENTION

Problem that the Invention is to Solve

The air conditioning system disclosed in Patent Document 1, in order to perform the heating operation or cooling operation for individual indoor units, needs to be provided with heat-medium path-flow switching devices for switching a kind of heat medium (heating-use heat medium or cooling-use heat medium), on one-to-one basis, in all flow paths for sending the heat medium to the relay unit to the respectively indoor units, and to be provided with heat-medium path-flow switching devices for switching kinds of heat medium, on one-to-one basis, in all flow paths for returning the heat medium from the relay unit to the respectively indoor units. Accordingly, in total two heat-medium path-flow switching devices are needed for each indoor unit. Moreover, since the indoor temperatures of the interior spaces to be air-conditioned are controlled by adjusting the flow rates of the heat-medium sent from the relay unit to the indoor units, one heat-medium flow-rate adjusting device is needed for each indoor unit.

Thus, a conventional air conditioning system needs two heat-medium flow-path switching devices and one heat-medium flow-rate adjusting device for each indoor unit, and further needs controlling parts such as motors for driving each of the devices, and various parts such as connection pipelines and fastening parts, thus raising problems of causing the system to be large in size and its manufacturing costs to be high.

The present invention is made in light of the above problems and aimed at providing an air conditioning system that has a plurality of indoor units and can be made compact and reduced in its manufacturing costs by employing integrated heat-medium flow-path switching devices each combining the functions of the heat-medium flow-path switching device and the heat-medium flow-rate adjusting device.

Means for Solving the Problem

A air-conditioning system according to the present invention comprises a refrigerant circulating path network connecting, with refrigerant lines, a compressor; a heat-source side heat exchanger for evaporating and gasifying or condensing and liquefying a heat-source side refrigerant; narrowing devices for controlling a flow rate of the refrigerant; refrigerant pipes in intermediate heat exchangers for exchanging heat between the heat-source side refrigerant and a use-side heat medium; and a refrigerant flow-path switching device for switching a circulation path of the refrigerant, for circulating the heat-source side refrigerant; and a heat medium circulating path network connecting, with heat-medium lines, pumps for pressurizing and sending the heat medium; use-side heat exchangers for exchanging heat between the heat medium with air in interior spaces to be air conditioned; and heat-medium pipes in the intermediate heat exchangers, for circulating the heat medium, wherein temperatures in the interior spaces to be air conditioned are controlled by exchanging heat, through the use-side heat exchangers, between the air in the interior spaces to be air-conditioned and the heat medium heated or cooled by the heat-source side refrigerant in the intermediate heat exchangers, the air conditioning system further comprising: integrated heat-medium flow-path switching devices connectedly interposed between the intermediate heat exchangers and the use-side heat exchangers, each integrated heat-medium flow-path switching device including thereinside: a heat-medium flow-path switching valve having holes formed in its sidewall and having a longitudinal inner partition, wherein the heat-medium flow-path switching valve is revolved to select either of the heated heat medium or the cooled heat medium for it to flow between the intermediate heat exchangers and the use-side heat exchangers, whereby air conditioning is performed.

Advantages of the Invention

An air conditioning system according to the present invention is provided with a plurality of integrated heat-medium flow-path switching devices each of which combines the functions of a heat-medium flow-path switching device and a heat-medium flow-rate adjusting device and is driven by a single drive unit. Therefore, this allows for reducing the number of heat-medium control parts (heat-medium flow-path switching part and heat-medium flow-rate adjusting part), various parts such as the drive units, heat-medium lines, and fastening parts, thus allowing the air conditioning system to be made compact and its manufacturing costs to be reduced.

EMBODIMENTS FOR CARRYING OUT THE INVENTION

Embodiment 1

Figure 1:
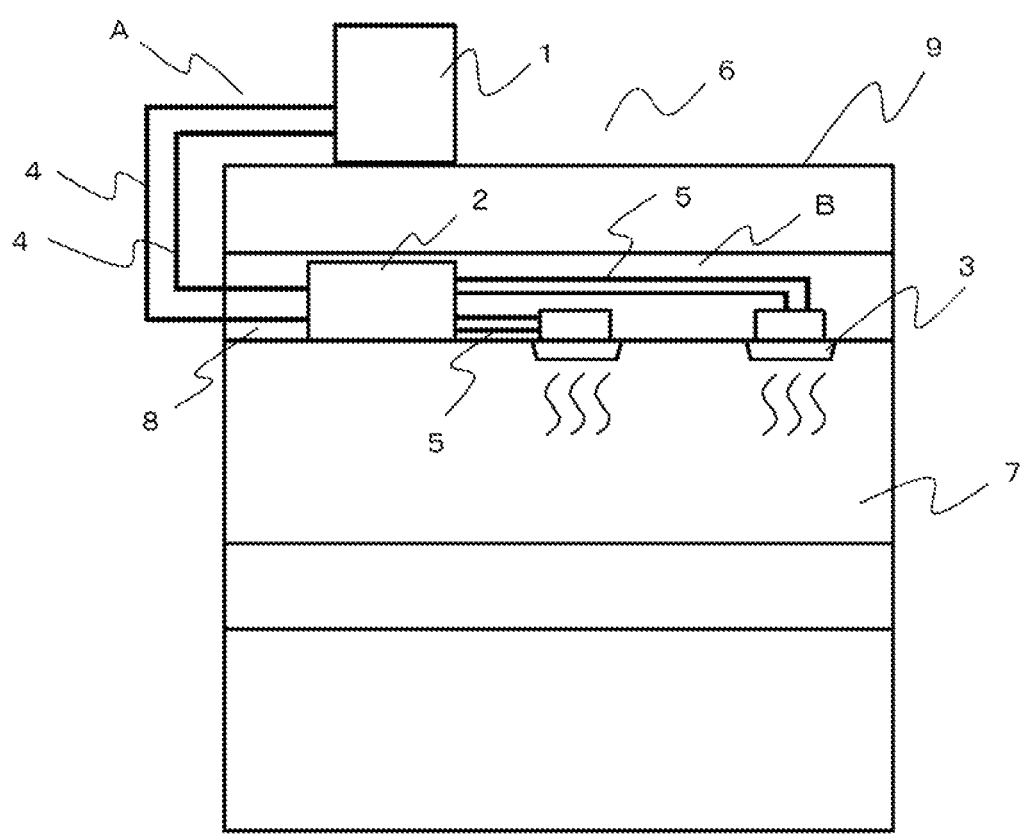
FIG. 1 is a schematic diagram showing an example of installation of an air conditioning system according to Embodiment 1 of the present invention.

An air conditioning system 100 according to Embodiment 1 of the present invention is described hereinafter. FIG. 1 is a schematic diagram showing an example of installation of the air conditioning system 100 according to Embodiment 1 of the present invention, in which the air conditioning system 100 having a plurality of indoor units 3 connected thereto is illustrated as a whole. The air conditioning system 100 is configured for each indoor unit to be able to freely select a cooling mode or a heating mode, using a refrigeration cycle for circulating refrigerants (a heat-source side refrigerant and a heat medium) in a refrigerant circulating path network A and a heat-medium circulating path network B. The air conditioning system 100 provides each of operation modes: a heating only operation mode in which the indoor units 3 all perform heating operation; a cooling only operation mode in which the indoor units 3 all perform cooling operation; a cooling-dominant operation mode, among operation modes mixed with cooling and heating, in which a cooling load is larger than a heating load; and a heating-dominant operation mode, among the operation modes mixed with cooling and heating. Details of these modes will be described later. Note that in the following drawings including FIG. 1, size relationships between each of component members may be different from actual sizes.

In FIG. 1, the air conditioning system 100 {according to Embodiment 1 of the present invention} has an outdoor unit (heat source unit) 1, the plurality of indoor units 3 and a relay unit 2 that is interposed between the outdoor unit 1 and the indoor units 3. The outdoor unit 1 is typically installed in an exterior space 6 (for example, the rooftop or the like) a building 9. The indoor units 2 are disposed in interior spaces 7 (for example, an office room or the like) to-be-air-conditioned inside the building 9. The relay unit 2 is disposed as a unit different from the outdoor unit 1 and the indoor units 3 in a space different from the exterior space 6 and the interior spaces 7, for example, in a ceiling 8 or the like. The outdoor unit 1 and the relay unit 2 are connected by refrigerant lines 4 for passing the heat-source side refrigerant. And the relay unit 2 and the indoor units 3 are connected by heat-medium lines 5 for passing the heat medium.

Next, the operation of the air conditioning system 100 {according to Embodiment 1 of the present invention} is described. The heat-source side refrigerant is sent from the outdoor unit 1 to the relay unit 2 through the refrigerant lines 4. The heat-source side refrigerant sent is heat-exchanged with the heat medium through an intermediate heat exchanger, which is described later, in the relay unit 2 to heat or cool the heat medium. In other words, hot water or cold water is generated in the intermediate heat exchanger. The hot water or the cold water generated in the relay unit 2 is selected by heat-medium flow-path switching devices and is sent through the heat-medium lines 5 to the indoor units 3 by heat medium sending devices, which is described later, to be used in heating operation or cooling operation for the interior spaces 7 at the indoor units 3.

As the heat-source side refrigerant, for example, the following may be used: a single refrigerant such as R-22, R-134a, and R-32; a near-azeotropic refrigerant mixture such as R-410A and R404A; a non-azeotropic refrigerant mixture such as R-407C; a refrigerant such as CF3CF=CH2, which has a double bond in chemical formula and has a low global warming potential or a mixture thereof, or a natural refrigerant such as CO2 or propane.

Meanwhile, as the heat medium, for example, the following may be used: water, an antifreeze liquid, a mixture of water and an antifreeze liquid, or a mixture of water and an additive having a high anti-corrosion effect.

While FIG. 1 exemplifies the outdoor unit 1 installed in the exterior space 6, the installation is not limited to this. The outdoor unit may be installed, for example in a machine room or inside the building 9 if there is a facility such as an exhaust duct for discharging the waste heat. Moreover, while FIG. 1 exemplifies the relay unit 2 installed in a ceiling, the installation is not limited to this. It is possible to install the relay unit in a common space or the like such as for installing an elevator. Furthermore, while FIG. 1 exemplifies the indoor units 3 of ceiling cassette type, the indoor units are not limited to this type but may be of any type such as ceiling embedded type or ceiling suspended type as long as they are able to blow out heated air or cooled air directly or indirectly, such as through ducts, to the interior spaces 7.

The relay unit 2 may be installed near the outdoor unit 1. In that case, it should be kept in mind that too long distance from the relay unit 2 to the indoor units 3 causes increase in power for sending the heat medium and an obstacle to energy saving. The numbers of outdoor units 1, indoor units 3, and relay units 2 connected to each other are not limited to those shown in FIG. 1. The numbers may be determined according to the number of or the volume of spaces to be air-conditioned.

For a case of connecting a plurality of relay units 2 to one outdoor unit 1, it is preferable to distributedly install the relay units 2 in a common space or in a ceiling space 8 of a building. This allows air-conditioning loads to be covered by the intermediate heat exchangers in each relay units 2. Moreover, this allows for shortening the distances between the indoor units 3 and the relay units 2, thereby achieving energy saving.

Figure 2:
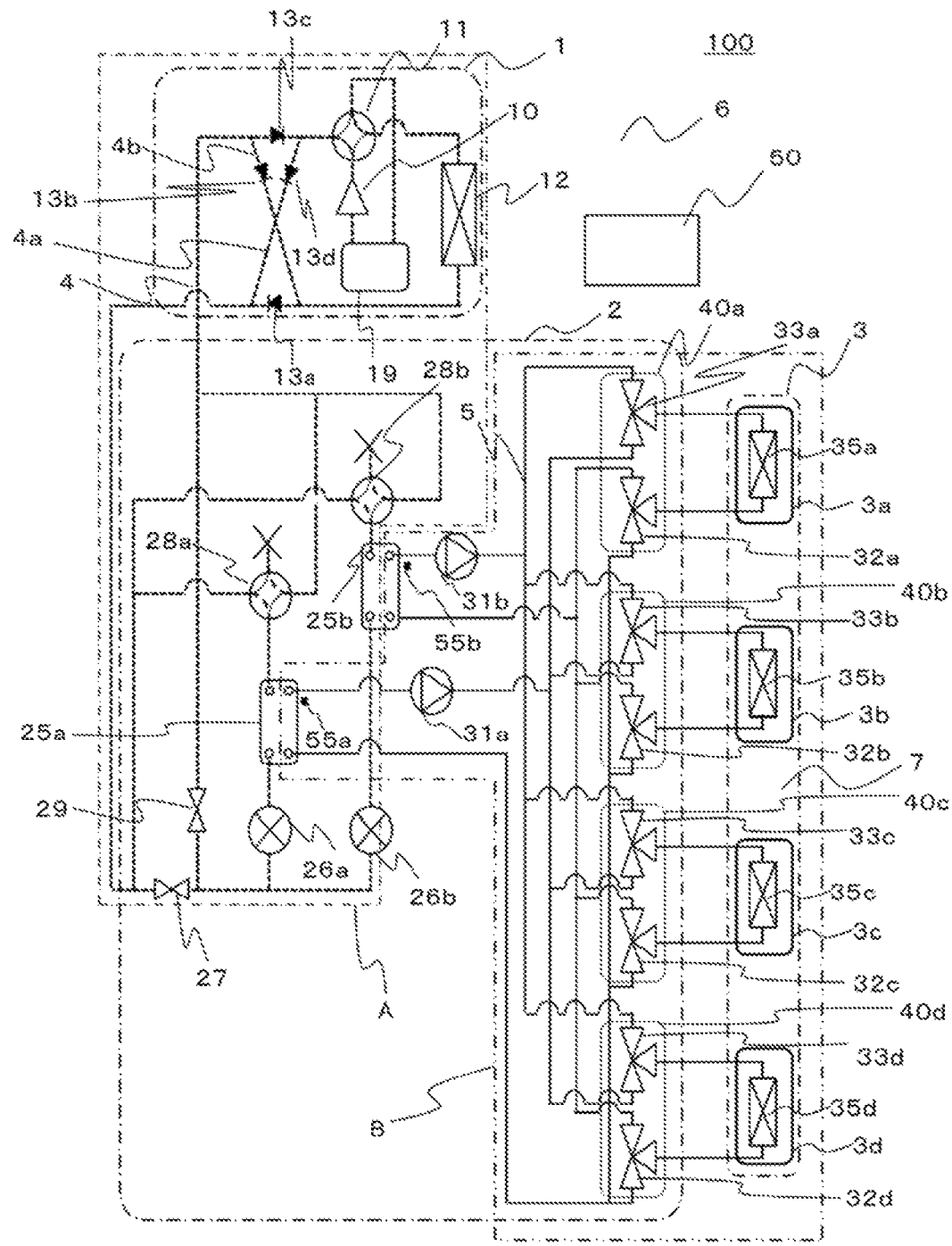
FIG. 2 is a schematic diagram showing an example of a configuration of the air conditioning system 100 according to Embodiment 1 of the present invention.

FIG. 2 is a schematic diagram showing an example of a configuration of the air conditioning system 100 according to Embodiment 1. As shown in FIG. 2, the outdoor unit 1 and the relay unit 2 are connected to each other with the refrigerant lines 4 via the intermediate heat exchangers (refrigerant-water heat exchangers) 25a, 25b provided in the relay unit 2. And the relay unit 2 and the indoor units 3 are connected to each other with the heat-medium lines 5 via the intermediate heat exchangers 25a, 25b and first heat-medium flow-path switching devices 32 (32a, . . . , 32d) and second heat-medium flow-path switching devices 33 (33a, . . . , 33d). Note that the refrigerant lines 4 and the heat-medium lines 5 are described later in detail. While FIG. 2 separately shows the first heat-medium flow-path switching devices 32 (32a, . . . , 32d) and the second heat-medium flow-path switching devices 33 (33a, . . . , 33d), this is for explaining the functions of each component constituting the heat-medium flow paths of the air conditioning system 100. Actually, the first heat-medium flow-path switching devices 32 (32a, . . . , 32d) and the second heat-medium flow-path switching devices 33 (33a, . . . , 33d) are integrated into integrated heat-medium flow-path switching devices 40 (40a, . . . , 40d) and the integrated switching devices are provided. The number of integrated heat-medium flow-path switching devices 40 provided is in accordance with that of indoor units 3. Here, for the four indoor units 3, in total four integrated heat-medium flow-path switching devices 40 are provided on a one-to-one basis. Embodiment 1 is characterized in the integrated heat-medium flow-path switching devices 40, and details thereof are described later.

[Indoor Unit]

The outdoor unit 1 is provided with a compressor 10, a first refrigerant flow-path switching device 11 such as a four-way valve, a heat-source side heat exchanger 12, and an accumulator 19, and they are connected in series by the refrigerant lines 4. The outdoor unit is further provided with connection pipes 4a, 4b for refrigerant and check valves 13a, 13b, 13c, 13d, in order that the heat-source side refrigerant flowing into the relay unit 2 is forced to flow in a given direction irrespective of the heating or cooling operation requested by the indoor units 3.

The compressor 10 sucks and compresses the heat-source side refrigerant to change the heat-source side refrigerant into a high pressure and high temperature state and sends it to flow through the refrigerant circulating path network A (see the portion enclosed by the dot-dash lines in FIG. 2), and may preferably be, for example, a capacity controllable inverter compressor or the like. The first refrigerant flow-path switching device 11 is for switching the flow of the heat-source side refrigerant between the heating operation in the heating only operation mode or the heating-dominant operation mode and the cooling operation in the cooling only operation mode or the cooling-dominant operation mode.

The heat-source side heat exchanger 12 functions as an evaporator during the heating operation or as a condenser (radiator) during the cooling operation to evaporate and gasify or condense and liquefy the heat-source side refrigerant by heat exchange between the heat-source side refrigerant and air supplied from a fan or the like (not shown). The accumulator 19 is provided on the suction side of the compressor 10 to retain an excess of the refrigerant caused by difference between the heating operation and the cooling operation or by a transient operation change.

The check valve 13c is provided in the refrigerant line 4, which are indicated by the dotted line (Note that the heat-medium lines are indicated by the solid line.) between the relay unit 2 and the first refrigerant flow-path switching device 11 to allow the heat-source side refrigerant to flow only in a predetermined direction (direction from the relay unit 2 to the outdoor unit 1). The check valve 13a is provided in the refrigerant line 4 between heat-source side heat exchanger 12 and the relay unit 2 to allow the heat-source side refrigerant to flow only in a predetermined direction (direction from the outdoor unit 1 to the relay unit 2). The check valve 13d is provided in the connection pipe 4a for refrigerant to pass the heat-source side refrigerant discharged from the compressor 10 to the relay unit 2 during the heating operation. The check valve 13b is provided in the connection pipe 4b for refrigerant to pass the heat-source side refrigerant returning from the relay unit 2 to the suction side of the compressor 10 during the heating operation.

The connection pipe 4a for the refrigerant connects, in the outdoor unit 1, the refrigerant line 4 between the first refrigerant flow-path switching device 11 and the check valve 13c to the refrigerant line 4 between the check valve 13a and the relay unit 2. The connection pipe 4b for refrigerant connects, in the outdoor unit 1, the refrigerant line 4 between the check valve 13c and the relay unit 2 to the refrigerant line 4 between the heat-source side heat exchanger 12 and the check valve 13a. It should be noted that while FIG. 2 shows the example of providing the connection pipes 4a, 4b for refrigerant and the check valves 13a, 13b, 13c, 13d, the configuration of the outdoor unit is not limited to this. These are not necessarily provided.

[Indoor Unit]

The indoor units 3 each are provided with a use-side heat exchange 35. The use-side heat exchangers 35 are connected by the heat-medium lines 5 to first heat-medium flow-path switching devices 32 and second heat-medium flow-path switching devices 33 in the relay unit 2. The use-side heat exchangers 35 perform heat exchange between the heat medium and air supplied from the blower such as a not-shown fan to generate heated or cooled air to be supplied to the interior spaces 7.

FIG. 2 exemplifies the relay unit 2 connected to four indoor units 3, which are designated at 3a, 3b, 3c, 3d from the top. The use-side heat exchangers 35 are also shown as designated at 35a, 35b, 35c, 35d from the top in one-to-one correspondence with the indoor units 3a, . . . , 3d. It should be noted that as shown in FIG. 1, the number of indoor units connected is not limited to four shown in FIG. 2.

[Relay Unit]

The relay unit 2 is provided with the intermediate heat exchangers 25 (25a, 25b) of two or more; two narrowing devices 26 (26a, 26b); two opening/closing devices 27, 29; two second refrigerant flow-path switching device 28 (28a, 28b); two heat medium sending devices, i.e., pumps 31 (31a, 31b); and the four integrated heat-medium flow-path switching devices 40 (40a, 40b, 40c, 40d).

The two intermediate heat exchangers 25 (25a, 25b) function as condensers (radiators) when heating energy is supplied to the indoor units 3 performing a heating operation or as evaporators when cooling energy is supplied to the indoor units 3 performing a cooling operation, to transfer, to the heat medium by heat exchange between the heat-source refrigerant and the heat medium, the cooling energy or the heating energy generated by the outdoor unit 1 and sent by the heat-source side refrigerant. The intermediate heat exchanger 25a is interposed between the narrowing device 26a and the second refrigerant flow-path switching device 28a in the refrigerant circulating path network A, to be used for cooling the heat medium during the cooling and heating mixed operation mode. Likewise, the intermediate heat exchanger 25b is interposed between the narrowing device 26b and the second refrigerant flow-path switching device 28b in the refrigerant circulating path network A, to be used for heating the heat medium during the cooling and heating mixed operation mode.

The two narrowing devices 26 (26a, 26b) function as a pressure reducing valve, i.e., an expansion valve to expand the heat-source side refrigerant by reducing the pressure thereof. The narrowing device 26a is disposed in the upstream side of the intermediate heat exchangers 25a with respect to the flow of the heat-source side refrigerant during the cooling operation. Also, the narrowing device 26b is disposed in the upstream side of the intermediate heat exchangers 25b with respect to the flow of the heat-source side refrigerant during the cooling operation. The two narrowing devices 26 may preferably be made up of, for example, an electronic expansion valve or the like that is controllably variable in its aperture.

The two opening/closing devices 27, 29 are made up of a solenoid valve or the like capable of opening and closing operation by energization, to open and close the refrigerant lines 4. Specifically, the opening and closing operation of the two opening/closing devices is controlled according to the operation modes, to switch the flow path of the heat-source side refrigerant. The opening/closing device 27 is disposed in the inlet side of the refrigerant line 4 (in the lowermost portion among the refrigerant lines 4 connecting between the outdoor unit 1 and relay unit 2). The opening/closing device 29 is disposed in the line (bypass line) connecting between the inlet side of the refrigerant line 4 and the outlet side thereof. In addition, the opening/closing devices 27, 29 may be a device that can switch the refrigerant flow path. For example, an electronic expansion valve or the like whose aperture is controllably variable can be used.

The two second refrigerant flow-path switching devices 28 (28a, 28b) are made up of, for example, a four-way valve or the like, to switch the flow of the heat-source side refrigerant so that the intermediate heat exchanges 25 acting as the condenser or the evaporator according to the operation modes. The second refrigerant flow-path switching device 28a is disposed in the downstream of the intermediate heat exchanges 25a with respect to the flow of the heat-source side refrigerant during the cooling operation. The second refrigerant flow-path switching device 28b is disposed in the downstream of the intermediate heat exchanges 25b with respect to the flow of the heat-source side refrigerant during the cooling only operation mode.

The two pumps 31 (31a, 31b) circulate the heat medium flowing through the heat-medium lines 5 in the heat-medium circulating path network B (see the portion enclosed by the dash-dot-dot line in FIG. 2). The pump 31a is disposed in the line 5 between the intermediate heat exchanges 25a and the integrated heat-medium flow-path switching devices 40. The pump 31b is disposed in the heat-medium line 5 between the intermediate heat exchanges 25b and the integrated heat-medium flow-path switching devices 40. The two pumps 31 may preferably be made up of, for example, a variable capacity pump or the like so as to adjust their flow rates according to magnitude of loads in the indoor units 3.

The integrated heat-medium flow-path switching devices 40 whose count is the same as that of indoor units 3 are provided, and designated, as shown in of FIG. 2, at 40a, 40b, 40c, 40d from the top correspondingly to the indoor units. The integrated heat-medium flow-path switching devices 40 have a function of switching the flow paths for the heat medium to be sent to and returned from the use-side heat exchangers 35 from and to either of the intermediate heat exchanger 25a or 25b selected according to the operation mode (heating operation or cooling operation) of the individual indoor units 3 connected with the integrated heat-medium flow-path switching devices. The integrated heat-medium flow-path switching devices further have a function of sending an optimum amount of heat medium according to indoor loads by controlling the flow rates of the heat medium flowing to the use-side heat exchangers 35 using temperatures of the heat medium flowing to and from the use-side heat exchangers 35.

In the relay unit 2, temperature sensors 55 (55a, 55b) are provided for measuring heat-medium temperatures at the outlet sides of the intermediate heat exchangers 25. Information (temperature information) measured with the temperature sensors 55 is sent to a controller 50 that centrally controls the operation of the air conditioning system 100, to be utilized for controlling the drive frequency of the compressor 10, the revolution speed of the not shown blower, switching of the first refrigerant flow-path switching device 11, the drive frequency of the pumps 31, switching of the second refrigerant flow-path switching devices 28, switching of the paths of the heat medium, adjusting of the flow rates of the heat medium in the indoor units 3, and the like.

In addition, while the above example case is described assuming that the controller 50 is mounted in the relay unit 2, the mounting of the controller is not limited to this. The controller may be communicably mounted in the outdoor unit 1, the indoor units 3, or each unit, to control.

The controller 50 is made up of a microcomputer and the like to control each actuator on the basis of information detected by various detection means and demand from a remote controller, that is, to control the drive frequency of the compressor 10; the revolution speed (including on and off of the revolution) of the blower; switching of the first refrigerant flow-path switching device 11, the drive frequency of the pumps 31; the apertures of the narrowing devices 26; opening and closing of the opening/closing devices; switching of the second refrigerant flow-path switching devices 28; switching of the integrated heat-medium flow-path switching devices 40, driving of them, and the like.

The heat-medium lines 5 for passing the heat medium include a line connected with the intermediate heat exchangers 25a and a line connected with the intermediate heat exchangers 25b. The heat-medium lines 5 are branched in accordance with the number of indoor units 3 connected to the relay unit 2 (here, branched into four). The branched heat-medium lines 5 are connected to the integrated heat-medium flow-path switching devices 40. By controlling the integrated heat-medium flow-path switching devices, it is determined whether to allow the heat medium to flow from the intermediate heat exchangers 25a into the use-side heat exchangers 35 or to allow the heat medium to flow from the intermediate heat exchangers 25b into the use-side heat exchangers 35.

Thus, in the air conditioning system 100, the refrigerant circulating path network A is configured to connect with the refrigerant lines 4 the compressor 10, the first refrigerant flow-path switching device 11, the heat-source side heat exchanger 12, the opening/closing devices 27, 29, the second refrigerant flow-path switching devices 28, refrigerant pipes in the intermediate heat exchangers 25, the narrowing devices 26, and the accumulator 19. And the heat-medium circulating path network B is configured to connect with the heat-medium lines 5 the heat medium pipes in the intermediate heat exchangers 25, the pumps 31, the integrated heat-medium flow-path switching devices 40, and the use-side heat exchangers 35. In short, the multiple use-side heat exchangers 35 each are parallel connected to the intermediate heat exchangers 25, and the heat-medium circulating path network B is configured to be redundant the multiple branched heat medium lines.

Thus, in the air conditioning system 100, the outdoor unit 1 and the relay unit 2 are connected via the intermediate heat exchangers 25a, 25b disposed in the relay unit 2, and the relay unit 2 and the indoor units 3 are connected via the intermediate heat exchangers 25a, 25b disposed in the relay unit 2. In other words, the air conditioning system 100 is configured such that heat exchange is performed, in the intermediate heat exchangers 25a, 25b, between the heat-source side refrigerant circulating the refrigerant circulating path network A and the heat medium circulating the refrigerant circulating path network B. With such configuration, the air conditioning system 100 can perform an optimum cooling or heating operation according to indoor loads.

[Operation Modes]

Operation modes performed by the air conditioning system 100 are described. The air conditioning system 100 is configured to allow each indoor unit 3 to perform a heating operation or a cooling operation on the basis of demands from the respective indoor unit 3. Put differently, the air conditioning system 100 is configured to allow all indoor units 3 to perform the same operations as well as to allow the indoor units 3 to perform different operations from each other.

The operation modes performed by the air conditioning system 100 are {classified into} a heating only operation mode in which all running indoor units 3 carry out heating operations; a cooling only operation mode in which all running indoor units 3 carry out cooling operations; a cooling-dominant operation mode, among the cooling and heating mixed operation mode, in which a cooling load is larger than a heating load; and a heating-dominant operation mode, among the cooling and heating mixed operation mode, in which a heating load is larger than a cooling load. Each operation mode is described below along with flows of the heat-source side refrigerant and the heat medium.

[Heating Only Operation Mode]

Figure 3:
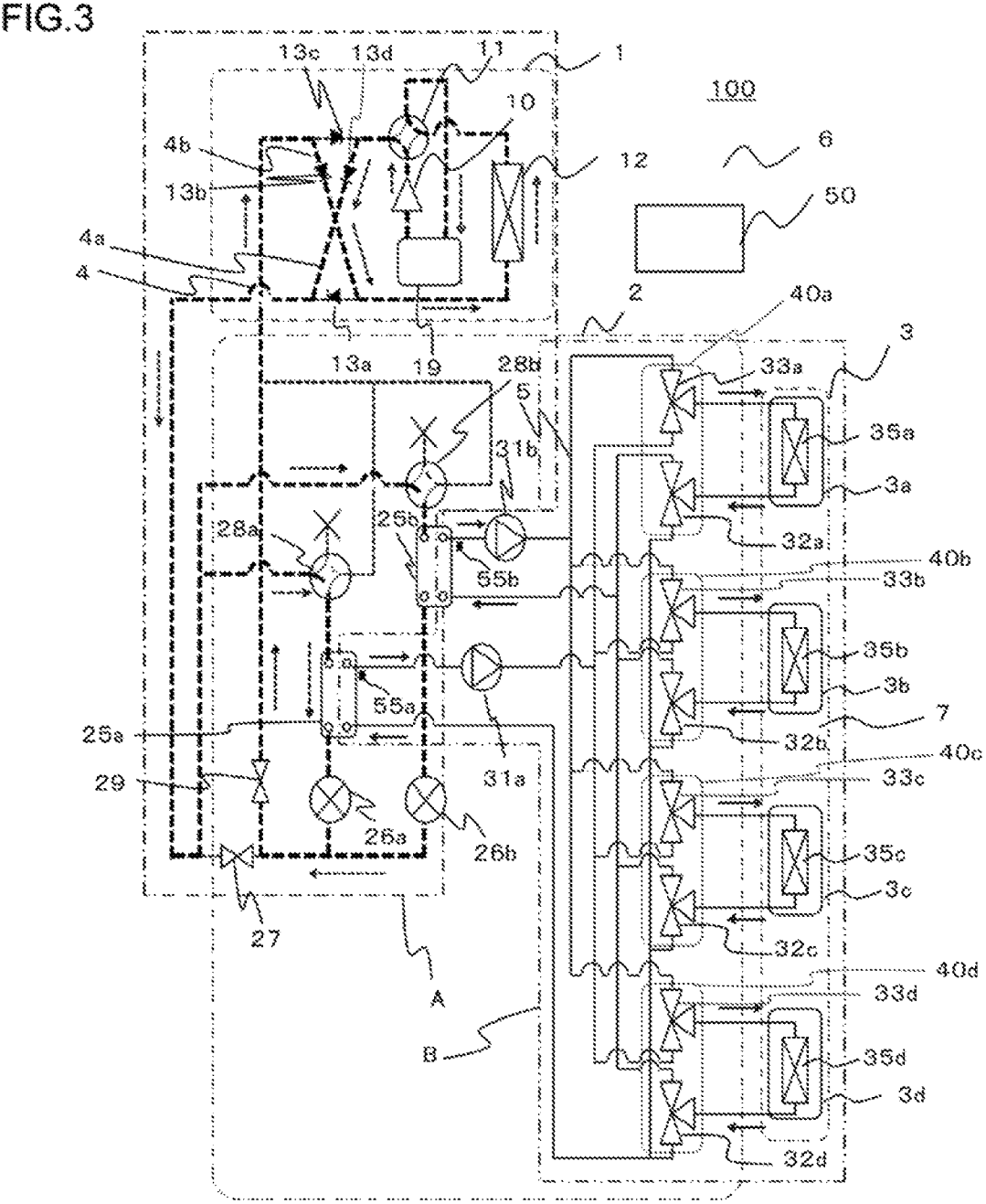
FIG. 3 is a diagram showing the flows of a refrigerant and a heat medium during a heating only operation mode of the air conditioning system according to Embodiment 1 of the present invention.

FIG. 3 is a diagram showing flows of the refrigerants and a configuration of flow path networks thereof during the heating only operation mode of the air conditioning system 100. Here, the heating only operation mode is described taking as an example a case of heating loads being generated in all use-side heat exchangers 35 (35a, . . . , 35d). In addition, in FIG. 3, the heavy broken lines indicate the pipelines through which the heat-source side refrigerant circulates, and the broken-line arrows indicate the flow direction of the heat-source side refrigerant and the solid-line arrows indicate that of the heat medium.

In the heating only operation mode, in the outdoor unit 1, the first refrigerant flow-path switching device 11 is switched for the heat-source side refrigerant discharged from the compressor 10 to flow into the relay unit 2 without passing through the heat-source side heat exchanger 12. In the relay unit 2, pumps 31a, 31b are driven and the integrated heat-medium flow-path switching devices 40 are opened. By opening the flow paths in the integrated heat-medium flow-path switching devices 40 (40a, . . . , 40d), the heat medium is circulated between each of the intermediate heat exchangers 25a, 25b and the use-side heat exchangers 35 (35a, . . . , 35d). Moreover, the second refrigerant flow-path switching devices 28a, 28b are switched to the heating side, and the opening/closing device 27 is closed and the opening/closing device 29 is opened.

The flow of the heat-source side refrigerant in the refrigerant circulating path network A is described first. The compressor 10 compresses the refrigerant of low pressure and low temperature into a high pressure and high temperature gas refrigerant to discharge. The high pressure and high temperature gas refrigerant discharged from the compressor 10 passes through the first refrigerant flow-path switching device 11 and then passes through the connection pipe 4a for refrigerant and the check valve 13d, to flow out from the outdoor unit 1. The high pressure and high temperature gas refrigerant flowing out from the indoor unit 1 is sent to the relay unit 2 though the refrigerant line 4. The high pressure and high temperature gas refrigerant flowing into the relay unit 2 is branched to flow into the intermediate heat exchangers 25a, 25b through the second refrigerant flow-path switching devices 28a, 28b, respectively.

The high pressure and high temperature gas refrigerant flowing into the intermediate heat exchangers 25a, 25b is condensed into a high pressure liquid refrigerant while radiating heat to the heat medium circulating in the heat-medium circulating path network B. The liquid refrigerant flowing out from the intermediate heat exchangers 25a, 25b expands at the narrowing devices 26a, 26b into a low pressure and low temperature two-phase refrigerant. The two-phase refrigerant, after joining together, flows out from the relay unit 2 though the opening/closing device 29, and returns to the outdoor unit 1 though the refrigerant line 4. The refrigerant returning to the outdoor unit 1 flows through the connection pipe 4b for refrigerant and check valve 13b into the heat-source side heat exchanger 12 serving as the evaporator.

Then, the heat-source side refrigerant flowing into the heat-source side heat exchanger 12 receives heat from the air in the exterior space 6 (hereinafter, referred to as external air) through the heat-source side heat exchanger 12, to become a low pressure and low temperature gas refrigerant. The low pressure and low temperature gas refrigerant flowing out from the heat-source side heat exchanger 12 is sucked again into the compressor 10 through the first refrigerant flow-path switching device 11 and the accumulator 19.

While a method of keeping constant the temperature difference between the heat-source side refrigerant and the load-side medium (i.e., the heat medium) generally used for the purpose of saving energy in heating and cooling, in the present embodiment, the apertures of the narrowing devices 26 is controlled to keep constant the degree of subcooling that are defined as the differences between saturation temperatures converted from the pressures of the heat-source side refrigerant flowing between the intermediate heat exchangers 25 and the narrowing devices 26, and temperatures at the outlets of the intermediate heat exchangers 25. Additionally, if temperatures are measurable at intermediate positions in the intermediate heat exchangers 25, the intermediate position temperatures may be used instead of the converted saturation temperatures. In this case, pressure sensors need not be provided, thus allowing for making up the system at low costs.

Next, flow of the heat medium in the heat-medium circulating path network B is described. In the heating only operation mode, heat energy of the heat-source side refrigerant is transferred to the heat medium in both intermediate heat exchangers 25a, 25b, and the heated heat medium circulates in the heat-medium lines 5 by the pumps 31a, 31b. The heat medium pressurized by the pumps 31a, 31b is sent to the use-side heat exchangers 35 (35a, . . . , 35d) through the integrated heat-medium flow-path switching devices 40. Then, the heat medium radiates heat to the indoor air through the use-side heat exchangers 35 (35a, . . . , 35d), whereby heating of the interior spaces 7 is performed.

After that, the heat medium flows out from the use-side heat exchangers 35 (35a, . . . , 35d) and flows again into the integrated heat-medium flow-path switching devices 40. At that time, the heat medium is sent to the use-side heat exchangers 35 (35a, . . . , 35d), with the flow rates being controlled by a flow rate adjusting function of the integrated heat-medium flow-path switching devices 40 to cover the air-conditioning loads required for the interior spaces. The heat medium flowing out from the integrated heat-medium flow-path switching devices 40 returns to the intermediate heat exchangers 25a, 25b where the amount of heat supplied to the air in the interior spaces 7 through the indoor units 3 is received from the heat-source side refrigerant, and then is sucked again into the pumps 31a, 31b.

Thus, the air-conditioning loads required for the interior spaces 7 can be covered by controlling the integrated heat-medium flow-path switching devices 40 to keep at target values the differences between the temperature measured with the temperature sensor 55a or 55b and temperatures of the heat medium flowing out from the use-side heat exchangers 35. The temperature of either temperature sensor 55a or 55b or the average temperature of these sensors may be used as the outlet temperature of the intermediate heat exchangers 25 (25a, 25b).

At this time, the apertures of the integrated heat-medium flow-path switching devices 40 are controlled according to the outlet temperatures of the intermediate heat exchangers 25a, 25b so as to ensure the flow paths to both intermediate heat exchangers 25a, 25b. In addition, while the integrated heat-medium flow-path switching devices 40 should essentially be controlled according to the differences between the respective temperatures at the inlets and the outlets of the use-side heat exchangers 35, since the temperatures of the heat medium at the inlets of the use-side heat exchangers 35 are substantially the same as those measured with the temperature sensors 55, using the temperature sensors 55 allows for reducing the number of temperature sensors, thus making up the system at low costs.

In the heating only operation mode, since the heat medium need not be sent to a use-side heat exchanger 35 with no heat load (including thermostat-off), the flow path in the corresponding integrated heat-medium flow-path switching device 40 is closed for the heat medium so as not to flow to the use-side heat exchanger 35. In FIG. 3, the heat medium are sent to all use-side heat exchangers 35 (35a, 35b, 35c, 35d,) because heat loads are generated therein. However, when no heat load is generated, the corresponding integrated heat-medium flow-path switching device 40 may be fully closed. When a heat load is generated again, the corresponding integrated heat-medium flow-path switching device 40 may be opened to circulate the heat medium. This is the same as with the other operation modes described below.

[Cooling Only Operation Mode]

Figure 4:
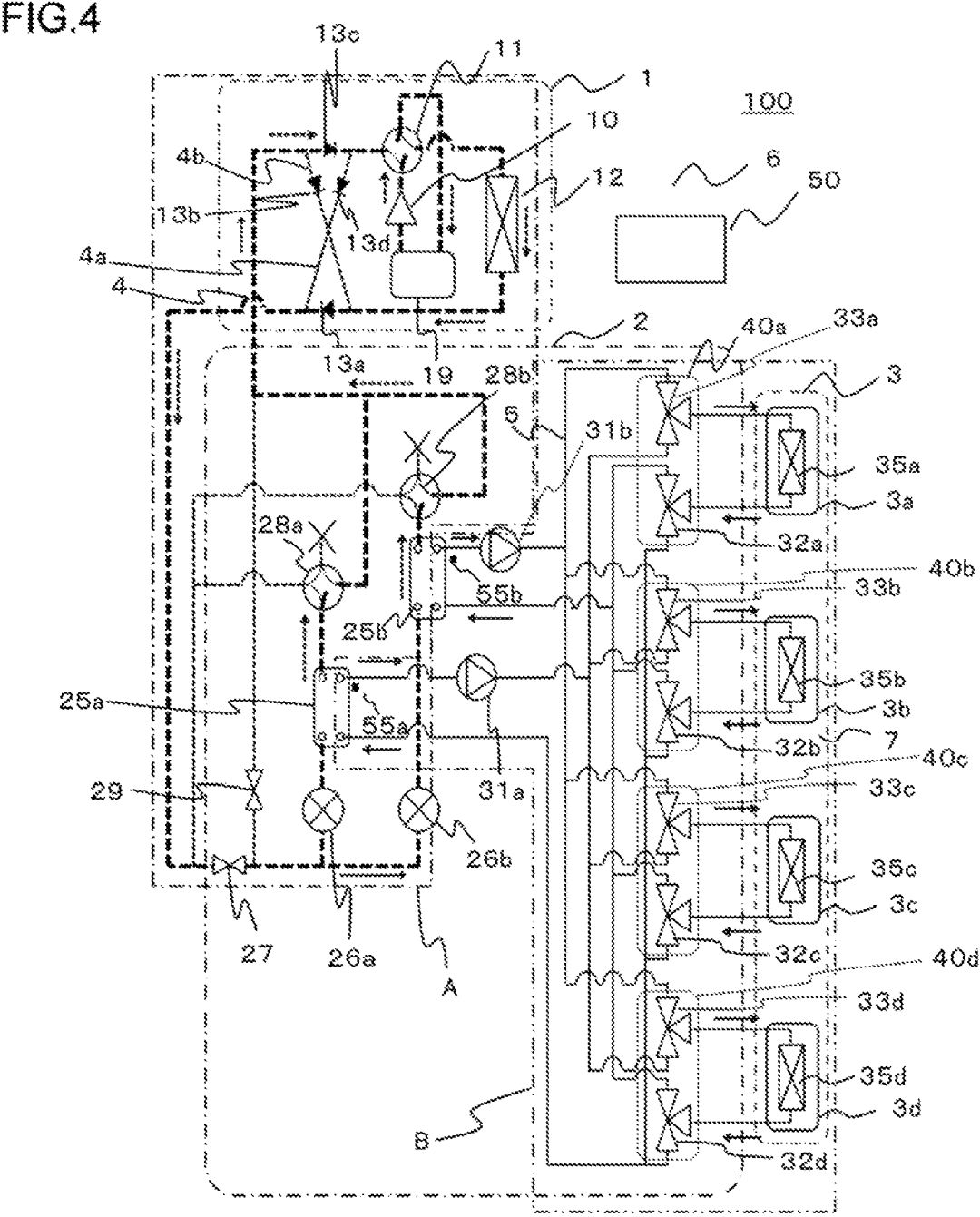
FIG. 4 is a diagram showing the flows of the refrigerant and the heat medium during a cooling only operation mode of the air conditioning system according to Embodiment 1 of the present invention.

FIG. 4 is a diagram showing flows of the refrigerants and a configuration of flow paths thereof during the cooling only operation mode of the air conditioning system 100. Here, the heating only operation mode is described taking as an example a case of cooling loads being generated in all use-side heat exchangers 35 (35a, 35b, 35c, 35d). In addition, in FIG. 4, the flow directions of the heat-source side refrigerant are indicated by the broken-line arrows, and those of the heat medium are indicated by the solid-line arrows.

In the heating only operation mode, in the outdoor unit 1, the first refrigerant flow-path switching device 11 is switched for the heat-source side refrigerant discharged from the compressor 10 to flow into the heat-source side heat exchanger 12.

In the relay unit 2, pumps 31a, 31b are driven and the integrated heat-medium flow-path switching devices 40 are opened for the heat medium to circulate between each of the intermediate heat exchangers 25a, 25b and the use-side heat exchangers 35 (35a, 35b, 35c, 35d). At this time, the integrated heat-medium flow-path switching devices 40 are switched to the cooling side, and the opening/closing device 27 is opened and the opening/closing device 29 is closed.

The flow of the heat-source side refrigerant in the refrigerant circulating path network A is described first. The compressor 10 compresses the refrigerant of low pressure and low temperature into a high pressure and high temperature gas refrigerant to discharge. The high pressure and high temperature gas refrigerant discharged from the compressor 10 passes through the first refrigerant flow-path switching device 11 and then passes through the heat-source side heat exchanger 12, to become a liquid or two-phase refrigerant of high pressure and high temperature by being heat-exchanged with the external air. Then, the liquid or two-phase refrigerant passes through the check valve 13a and the refrigerant line 4, to flow out from the outdoor unit 1. The liquid or two-phase refrigerant of high pressure and high temperature flowing out from the indoor unit 1 is sent to the relay unit 2 though the refrigerant line 4. The liquid or two-phase refrigerant of high pressure and high temperature flowing into the relay unit 2 is branched after passing through the opening/closing device 27, and then expanded by the narrowing devices 26a, 26b into a low pressure and low temperature two-phase refrigerant. The two-phase refrigerant evaporates into a low temperature gas refrigerant while receiving heat from the heat medium circulating in the heat-medium circulating path network B. The gas refrigerant flowing out from the intermediate heat exchangers 25a, 25b flows out from the relay unit 2 through the second refrigerant flow-path switching devices 28a, 28b, and then passes through the connection pipe 4b for refrigerant and the check valve 13b and is sucked again into the compressor 10 through the first refrigerant flow-path switching device 11 and the accumulator 19. In the above cycle, the apertures of the narrowing devices 26 (26a, 26b) are controlled to keep constant the degree of superheating defined as differences between the temperatures at the outlets of the intermediate heat exchangers 25 and saturation temperatures converted from the pressures of the heat-source side refrigerant flowing between the intermediate heat exchangers 25 and the narrowing devices 26. Additionally, if temperatures are measurable at intermediate positions in the intermediate heat exchangers 25, the intermediate position temperatures may be used instead of the converted saturation temperatures. In this case, pressure sensors need not be provided, thus allowing for making up the system at low costs.

Next, flow of the heat medium in the heat-medium circulating path network B is described. In the cooling only operation mode, heat energy of the heat medium is transferred to the heat-source side refrigerant in both intermediate heat exchangers 25a, 25b, and the cooled heat medium is pressurized by the pumps 31a, 31b to be sent to the use-side heat exchangers 35 (35a, 35b, 35c, 35d) through the integrated heat-medium flow-path switching devices 40. Then, the cooled heat medium receives heat from the indoor air through the use-side heat exchangers 35 (35a, 35b, 35c, 35d), whereby cooling of the interior spaces 7 is performed.

After that, the heat medium flows out from the use-side heat exchangers 35 (35a, . . . , 35d) and flows into the integrated heat-medium flow-path switching devices 40 (40a, . . . , 40d). At this time, the heat medium is sent to the use-side heat exchangers 35 (35a, . . . , 35d), with the flow rates being controlled by the flow rate adjusting function of the integrated heat-medium flow-path switching devices to cover the air-conditioning loads required for the interior spaces. The heat medium flowing out from the integrated heat-medium flow-path switching devices 40 (40a, . . . , 40d) returns to the intermediate heat exchangers 25a, 25b where the amount of heat received from the air in the interior spaces 7 through the indoor units 3 is transferred to the heat-source side refrigerant, and then is sucked again into the pumps 31a, 31b.

Note that through the heat-medium lines 5 in the use-side heat exchangers 35, the heat medium flows in the direction to the first heat-medium flow-path switching devices 32 in the integrated heat-medium flow-path switching devices 40. Thus, the air-conditioning loads required for the interior spaces 7 can be covered by controlling the differences between the temperature measured with the temperature sensor 55a or 55b and temperatures of the heat medium flowing out from the use-side heat exchangers 35 to be kept at target values. The temperature of either temperature sensor 55a or 55b or the average temperature of these sensors may be used as the outlet temperature of the intermediate heat exchangers 25.

Thus, the apertures of the integrated heat-medium flow-path switching devices 40 are controlled according to the outlet temperatures of the intermediate heat exchangers 25a, 25b so as to ensure the flow paths to both intermediate heat exchangers 25a, 25b. In addition, while the integrated heat-medium flow-path switching devices 40 should essentially be controlled according to the differences between the respective temperatures at the inlets and the outlets the use-side heat exchangers 35, since the temperatures at the inlets of the use-side heat exchangers 35 are substantially the same as those measured with the temperature sensors 55, using the temperature sensors 55 allows for reducing the number of temperature sensors, thus making up the system at low costs.

[Mixed Operation Mode]

Figure 5:
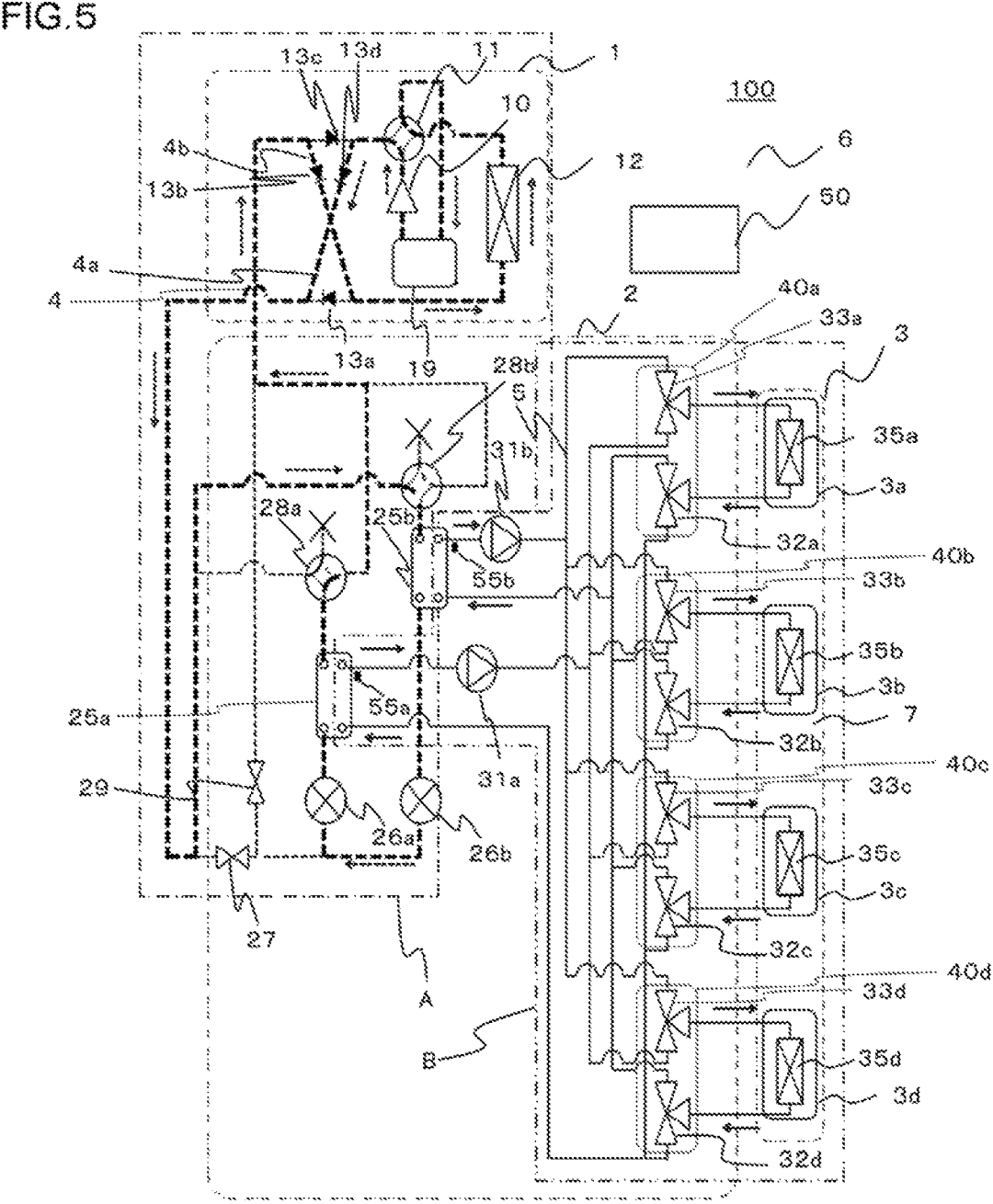
FIG. 5 is a diagram showing the flows of the refrigerant and the heat medium during a cooling and heating mixed operation mode of the air conditioning system according to Embodiment 1 of the present invention.

FIG. 5 is a diagram showing flows of the refrigerants and a configuration of flow paths thereof during the mixed operation mode of the air conditioning system 100. Among the mixed operation mode in which heating loads are generated in any units of the use-side heat exchangers 35 and cooling loads are generated in the other units, the heating-dominant operation mode is described with reference to FIG. 5. In addition, in FIG. 5, the heavy broken lines indicate the pipeline through which the heat-source side refrigerant circulates, and the broken-line arrows indicate the flow directions of the heat-source side refrigerant and the solid-line arrows indicate those of the heat medium.

In the heating-dominant operation mode shown in FIG. 5, in the outdoor unit 1, the first refrigerant flow-path switching device 11 is switched for the heat-source side refrigerant discharged from the compressor 10 to flow into the relay unit 2 without passing through the heat-source side heat exchanger 12. In the relay unit 2, the pumps 31a, 31b are driven and the integrated heat-medium flow-path switching devices 40 (40a, . . . , 40d) are opened to circulate the heat medium between the intermediate heat exchangers 25a and the use-side heat exchangers 35 under generation of cooling loads and between the intermediate heat exchangers 25b and the use-side heat exchangers 35 under generation of heating loads. At this time, the second refrigerant flow-path switching devices 28a, 28b are switched to the cooling side and the heating side, respectively, the narrowing device 26a is fully opened, and both opening/closing devices 27, 29 are closed.

The flow of the heat-source side refrigerant in the refrigerant circulating path network A is described first. The compressor 10 compresses the refrigerant of low temperature and low pressure into a high pressure and high temperature gas refrigerant to discharge. The high pressure and high temperature gas refrigerant discharged from the compressor 10 passes through the first refrigerant flow-path switching device 11, and then passes through the connection pipe 4a for refrigerant and the check valve 13d, to flow out from the indoor unit 1. The high pressure and high temperature gas refrigerant flowing out from the indoor unit 1 is sent to the relay unit 2 through the refrigerant line 4. The high pressure and high temperature gas refrigerant flowing into the relay unit 2 passes through the second refrigerant flow-path switching device 28b into the intermediate heat exchanger 25b acting as a condenser.

The gas refrigerant flowing into the intermediate heat exchanger 25b condenses into a liquid refrigerant while radiating heat to the heat medium circulating in the heat-medium circulating path network B. The liquid refrigerant flowing out from the intermediate heat exchanger 25b expands at the narrowing device 26b, to become a low pressure two-phase refrigerant. The low pressure two-phase refrigerant passing through the narrowing device 26b flows into the intermediate heat exchanger 25a acting as an evaporator. The low pressure two-phase refrigerant flowing into the intermediate heat exchanger 25a evaporates by receiving heat from the heat medium circulating the heat-medium circulating path network B, thereby to cool the heat medium. The low pressure two-phase refrigerant flowing out from the intermediate heat exchanger 25a flows out from the relay unit 2 through the second refrigerant flow-path switching device 28a, and returns to the outdoor unit 1 through the refrigerant line 4.

The low pressure two-phase refrigerant returning to the outdoor unit 1 flows through the check valve 13b into the heat-source side heat exchanger 12 acting as an evaporator. The refrigerant flowing into the heat-source side heat exchanger 12 becomes a low pressure and low temperature gas refrigerant by receiving heat from the external air through the heat-source side heat exchanger 12. The low pressure and low temperature gas refrigerant flowing out from the heat-source side heat exchanger 12 is sucked again into the compressor 10 through the first refrigerant flow-path switching device 11 and the accumulator 19.

Note that the aperture of the narrowing device 26b is controlled to keep at a target value the degree of subcooling of the refrigerant at the outlet of the intermediate heat exchanger 25b. It should be noted that the degree of subcooling may be controlled by the narrowing device 26a, with the narrowing device 26b being fully opened.

Next, the flow of the heat medium in the heat-medium circulating path network B is described. In the heating-dominant operation mode, heating energy of the heat-source side refrigerant is transferred to the heat medium through the intermediate heat exchanger 25b, and the heated heat medium is circulated through the heat-medium lines 5 by the pump 31b. Likewise, in the cooling-dominant operation mode, cooling energy of the heat-source side refrigerant is transferred to the heat medium through the intermediate heat exchanger 25a and the cooled heat medium is circulated through the heat-medium lines 5 by the pump 31a. The cooled heat medium pressurized by the pump 31a is sent through the integrated heat-medium flow-path switching devices 40 to the use-side heat exchangers 35 under generation of cooling loads, and the heated heat medium pressurized by the pump 31b is sent through the integrated heat-medium flow-path switching devices 40 to the use-side heat exchangers 35 under generation of heating loads.

At this time, the flow path in the integrated heat-medium flow-path switching device 40 that is connected with the indoor unit 3 being in the heating operation mode is switched to the lines connected to the intermediate heat exchangers 25b and the pump 31b, and the flow path in the integrated heat-medium flow-path switching device 40 that is connected with the indoor unit 3 being in the cooling operation mode is switched to the lines connected to the intermediate heat exchangers 25a and the pump 31a. Thus, the integrated heat-medium flow-path switching devices 40 allow for switching the heating-use or the cooling-use heat medium to be supplied to the indoor units 3.

The use-side heat exchangers 35 perform cooling operations for the interior spaces 7 by receiving heat from the indoor air to the heat medium or heating operations for the interior spaces 7 by radiating heat from the heat medium to the indoor air. At this time, the heat medium is sent to the use-side heat exchangers 35, with the flow rates being controlled by the flow rate adjusting function of the integrated heat-medium flow-path switching devices 40 to cover the air-conditioning loads required for the interior spaces.

The heat medium that is utilized in the cooling operation and whose temperature is somewhat increased by passing through the use-side heat exchangers 35 flows into the intermediate heat exchangers 25a through the integrated heat-medium flow-path switching devices 40 and is sucked again into the pump 31a. The heat medium that is utilized in a heating operation and whose temperature is somewhat decreased by passing through the use-side heat exchangers 35 flows into the intermediate heat exchangers 25b through the integrated heat-medium flow-path switching devices 40 and is sucked again into the pump 31b.

In this operation, the hot heat medium and the cool heat medium are not mixed with each other by the function of the integrated heat-medium flow-path switching devices 40 and respectively sent to the use-side heat exchangers 35 under heating loads and cooling loads. Thus, the heat medium utilized in the heating operation mode is sent as the heating-use heat medium to the intermediate heat exchangers 25b to receive heat from the refrigerant, and the heat medium utilized in cooling operation mode is sent as the cooling-use heat medium to the intermediate heat exchangers 25a to radiate heat to the refrigerant. Then, the heat medium is sent again to the pumps 31a, 31b after heat-exchanged with the refrigerant.

In addition, the air conditioning loads required for the interior spaces 7 can be covered by controlling to keep at target values the differences between the temperature measured with the temperature sensor 55b and temperatures of the heat medium flowing out from the use-side heat exchangers 35 being in the heating operation, and the differences between temperatures of the heat medium flowing out from the use-side heat exchangers 35 being in the cooling operation and the temperature measured with the temperature sensor 55a.

Figure 6:
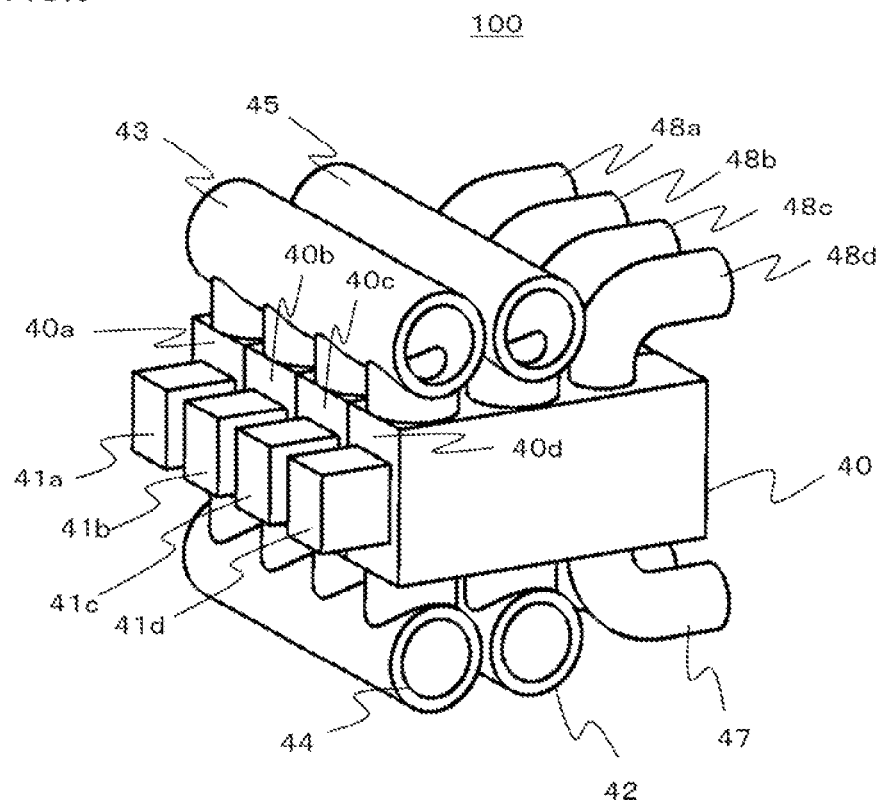
FIG. 6 is a schematic view of integrated heat-medium flow-path switching devices of the air conditioning system according to Embodiment 1 of the present invention.

FIG. 6 shows a schematic view of the integrated heat-medium flow-path switching devices 40 in the relay unit 2 of the air conditioning system 100.

The integrated heat-medium flow-path switching devices 40 in the relay unit 2 (not shown) of the air conditioning system 100 are configured to be one-to-one connected to the indoor units connected to the relay unit 2, and designate at 40a, . . . , 40d as shown in FIG. 6. While the number of integrated heat-medium flow-path switching devices connected here is four, the number thereof is not only limited to this but also can be desirably increased.

The integrated heat-medium flow-path switching devices 40 are provided with drive units 41 (41a, . . . , 41d) and connected with sending pipes 47 to indoor unit and return pipes 48 from indoor unit on a one to one basis. Furthermore, the integrated heat-medium flow-path switching devices are connected to the intermediate heat exchangers 25a (not shown) through a cooling-use heat-medium sending main pipe 42 and a cooling-use heat-medium returning main pipe 43 and to the intermediate heat exchangers 25b (not shown) through a heating-use heat-medium sending main pipe 44 and a heating-use heat-medium returning main pipe 45.

Figure 7:
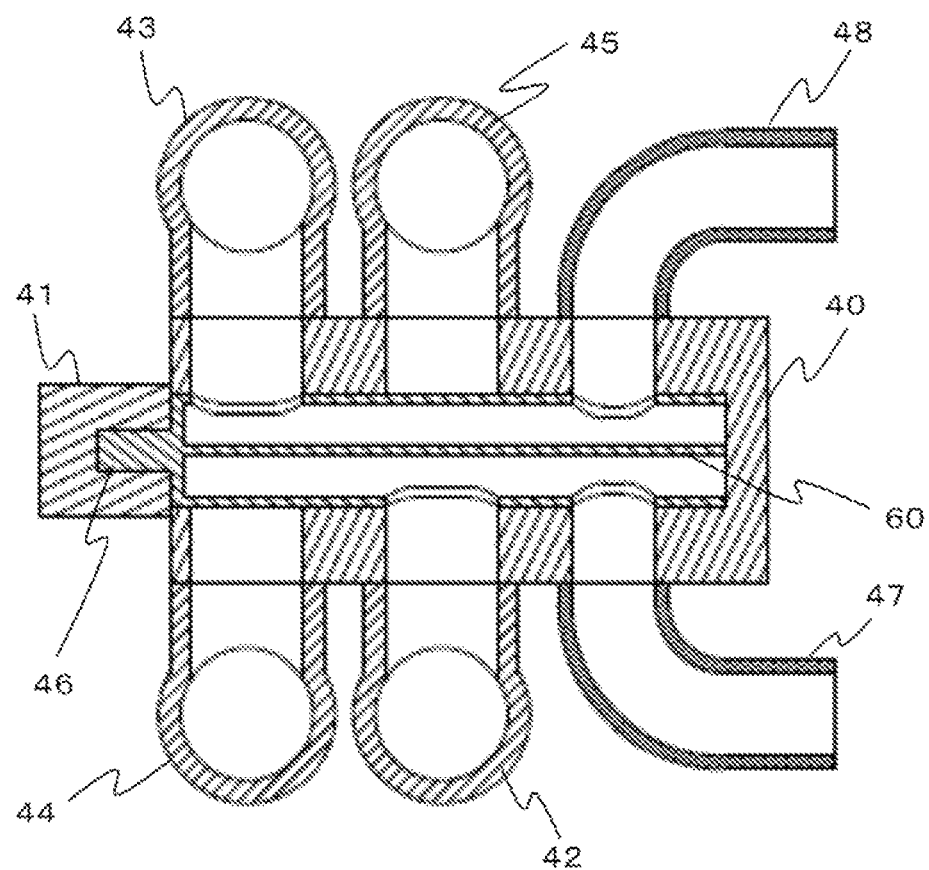
FIG. 7 is a cross-sectional view showing heat medium flow paths inside the integrated heat-medium flow-path switching device of the air conditioning system according to Embodiment 1 of the present invention.

FIG. 7 shows a cross-sectional view of the integrated heat-medium flow-path switching device 40. The integrated heat-medium flow-path switching devices each have a heat-medium flow-path switching valve 46 therein, and the heat-medium flow-path switching valve 46 is provided with a longitudinal inner partition 60 thereinside. Two different paths are thereby formed inside the heat-medium flow-path switching valve 46: a path for sending the heat medium from the intermediate heat exchangers 25 (not shown) to the indoor units 3 (not shown); and a path for returning the heat medium from the indoor units 3 (not shown) to the intermediate heat exchangers 25 (not shown). Actuation of the drive unit 41 to turn the heat-medium flow-path switching valve 46 allows either one of the cooling-use heat medium or the heating-use heat medium passed through holes formed in the sidewall of the heat-medium flow-path switching valve to be selectively sent to the heat medium circulating through the intermediate heat exchanger 25a (not shown) or the intermediate heat exchanger 25b (not shown), respectively. By employing for the drive unit 41 a device such as a stepping motor that is controllable in its turn angle, the aperture areas between the sidewall holes of the heat-medium flow-path switching valve 46 and the cooling-use heat-medium sending main pipe 42 (the cooling-use heat-medium returning main pipe 43) or the heating-use heat-medium sending main pipe 44 (the heating-use heat-medium returning main pipe 45) can also be controlled to adjust the flow rate of the heat medium.

Thus, providing the integrated heat-medium flow-path switching devices 40 on a one-to-one basis for the indoor units 3 (not shown) connected to the relay unit 2 (not shown) makes it possible to independently perform the selection of the cooling-use heat medium or the heating-use heat medium and the control of the flow rates thereof for the individual indoor units 3.

Next described are the action of the integrated heat-medium flow-path switching device 40 and flow of the heat medium thereinside in operation modes of the indoor units 3 (not shown). Here, the case of the mixed operation mode is described. Note that in the heating only operation mode, the heat medium for heating use is passed also through the cooling-use heat-medium sending main pipe 42 and the cooling-use heat-medium returning main pipe 43, and in the heating only operation mode, the heat medium for cooling use is passed also through the heating-use heat-medium sending main pipe 44 and the heating-use heat-medium returning main pipe 45. Since the action of the integrated heat-medium flow-path switching device 40 and the flow of the heat medium thereinside are the same in both operations, the description thereof is omitted.

[Cooling Operation Mode]

Figure 8:
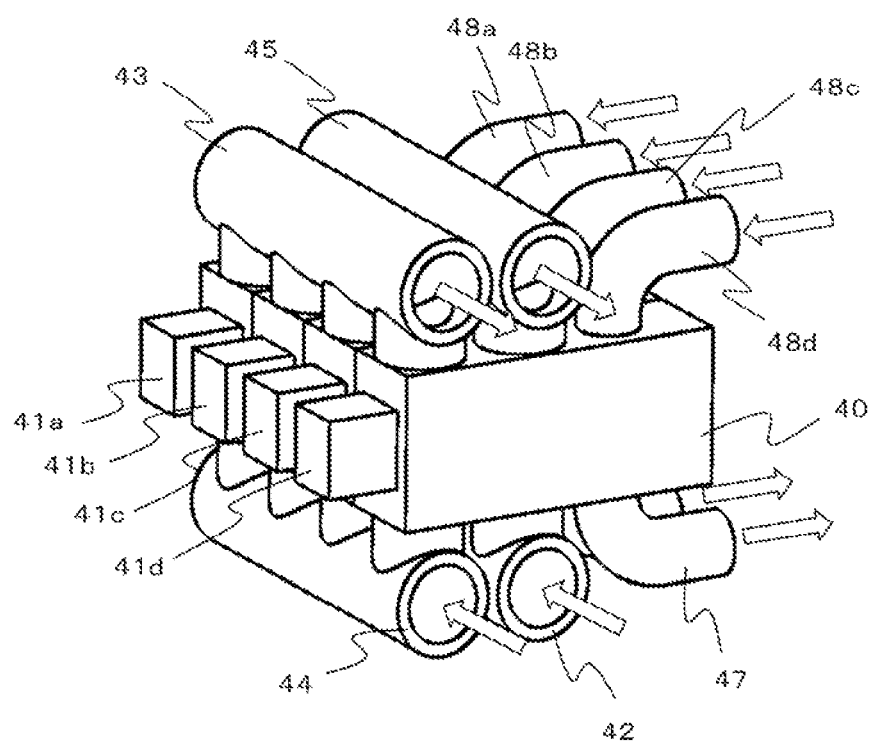
FIG. 8 is a schematic view showing heat medium flows at the integrated heat-medium flow-path switching devices of the air conditioning system according to Embodiment 1 of the present invention, during a cooling operation mode.

FIG. 8 shows a case of the indoor units 3 (not shown) being in a cooling operation mode, in which flow directions of the heat medium in the cooling-use heat-medium sending main pipe 42, the cooling-use heat-medium returning main pipe 43, the sending pipes 47 to indoor unit, and the return pipes 48 from indoor unit are indicated by the hollow solid-line arrows. In addition, since the heat medium is ordinarily kept flowing in the heating-use heat-medium sending main pipe 44 and the heating-use heat-medium returning main pipe 45, the flow directions in these main pipes are also indicated by the hollow solid-line arrows.

Figure 9:
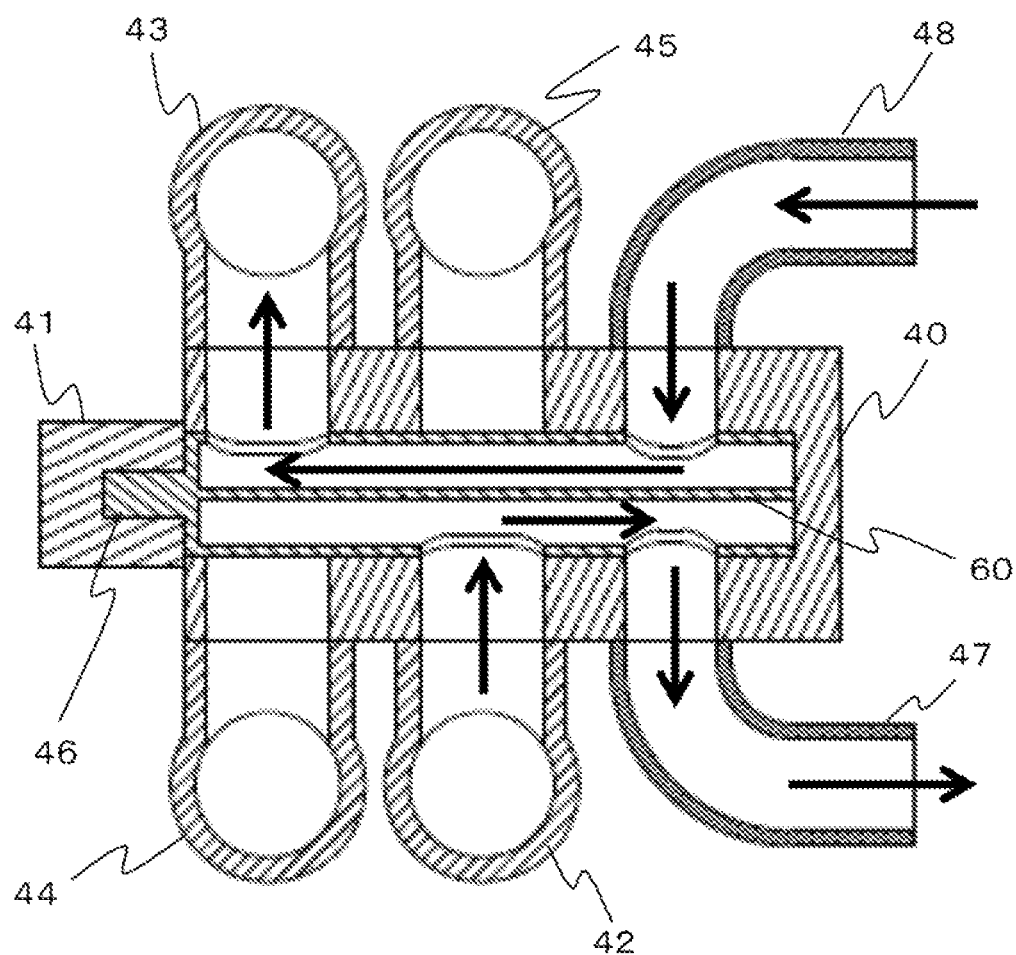
FIG. 9 is a cross-sectional view showing heat medium flows inside the integrated heat-medium flow-path switching device of the air conditioning system according to Embodiment 1 of the present invention, during the cooling operation mode.

FIG. 9 shows a cross-sectional view of the integrated heat-medium flow-path switching device 40 when the indoor units 3 (not shown) are in the cooling operation mode, in which the flow directions of the heat medium are indicated by the solid-line arrows.

In the cooling operation mode, the heat medium, after cooled by transferring heat to the heat-source side refrigerant through the intermediate heat exchanger 25a (not shown), is pressurized and discharged by the pump 31a to be sent to the integrated heat-medium flow-path switching device 40 through the cooling-use heat-medium sending main pipe 42. In order to cooling-operate the indoor unit 3 (not shown), i.e., to send the cooled heat medium to the indoor unit 3 (not shown), the heat-medium flow-path switching valve 46 provided in the integrated heat-medium flow-path switching device 40 is turned by the drive unit 41 to communicate between the cooling-use heat-medium sending main pipe 42 and the sending pipe 47 to indoor unit, and between the cooling-use heat-medium returning main pipe 43 and the return pipe 48 from indoor unit. The heat medium flow in the cooling-use heat-medium sending main pipe 42 is thereby passed through the heat-medium flow-path switching valve 46 and sent to the indoor unit 3 (not shown) through the sending pipe 47 to indoor unit.

The heat medium, after heat-exchanged with the air in the interior spaces through the use-side heat exchange 35 (not shown) in the indoor unit 3 (not shown), flows again into the integrated heat-medium flow-path switching device 40 through the return pipe 48 from indoor unit and returns to the intermediate heat exchanger 25a (not shown) through the cooling-use heat-medium returning main pipe 43.

At this time, in the heat-medium flow-path switching valve 46, the heat medium returning from the indoor unit 3 and the heat medium flowing to the indoor unit 3 are adjacently separated from each other by the partition 60, as shown in FIG. 9.

The heat medium returning to the intermediate heat exchanger 25a (not shown) is cooled by transferring heat to the heat-source side refrigerant, and is sent again to the integrated heat-medium flow-path switching device 40 through the cooling-use heat-medium sending main pipe 42.

The above is the action of the integrated heat-medium flow-path switching device 40 and the heat medium flow thereinside when the indoor unit 3 (not shown) are in the cooling operation. During the cooling operation, the drive unit 41 for the heat-medium flow-path switching valve 46 control the aperture areas between the heat-medium flow-path switching valve 46 and the cooling-use heat-medium sending main pipe 42 (the cooling-use heat-medium returning main pipe 43) to adjust the flow rate of the heat medium flowing through the indoor unit 3, so as to keep at target value the difference between the temperature of the heat medium measured with the temperature sensor 55a (not shown) provided in the relay unit 2 (not shown) and temperature of the heat medium measured in the use-side heat exchanger 35 (not shown). The temperatures in the interior spaces are thereby controlled.

[Heating Operation Mode]

Figure 10:
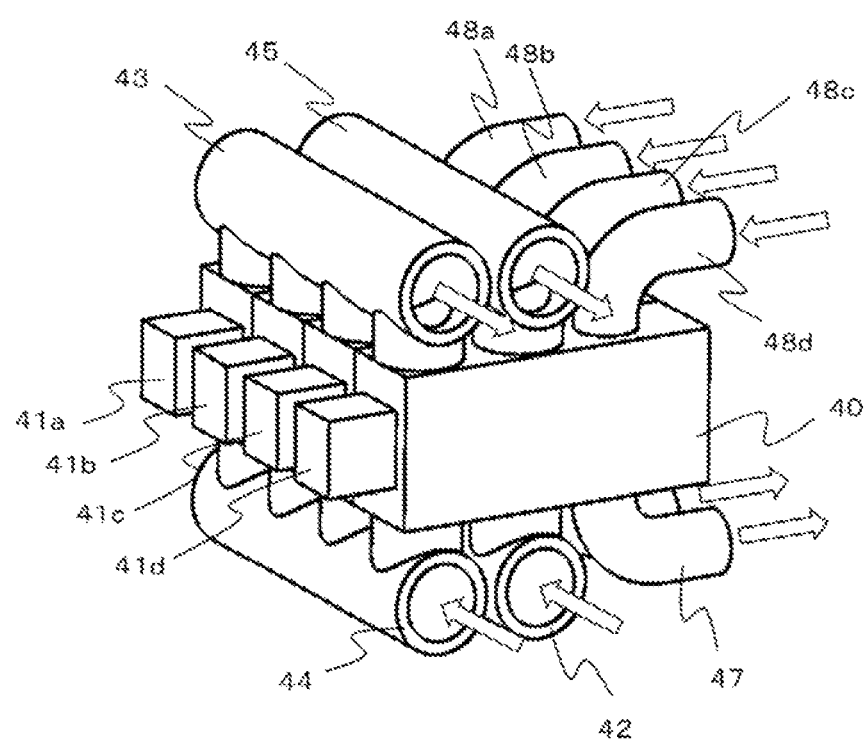
FIG. 10 is a schematic view showing heat medium flows at the integrated heat-medium flow-path switching devices of the air conditioning system according to Embodiment 1 of the present invention, during a heating operation mode.

FIG. 10 shows a case of the indoor units 3 (not shown) being in heating operation mode, in which flow directions of the heat medium in the heating-use heat-medium sending main pipe 44, the heating-use heat-medium returning main pipe 45, the sending pipes 47 to indoor units, and the return pipes 48 from indoor units are indicated by the hollow solid-line arrows. In addition, since the heat medium is ordinarily kept flowing in the cooling-use heat-medium sending main pipe 42 and the cooling-use heat-medium returning main pipe 43, the flow directions in these main pipes are also indicated by the hollow solid-line arrows.

Figure 11:
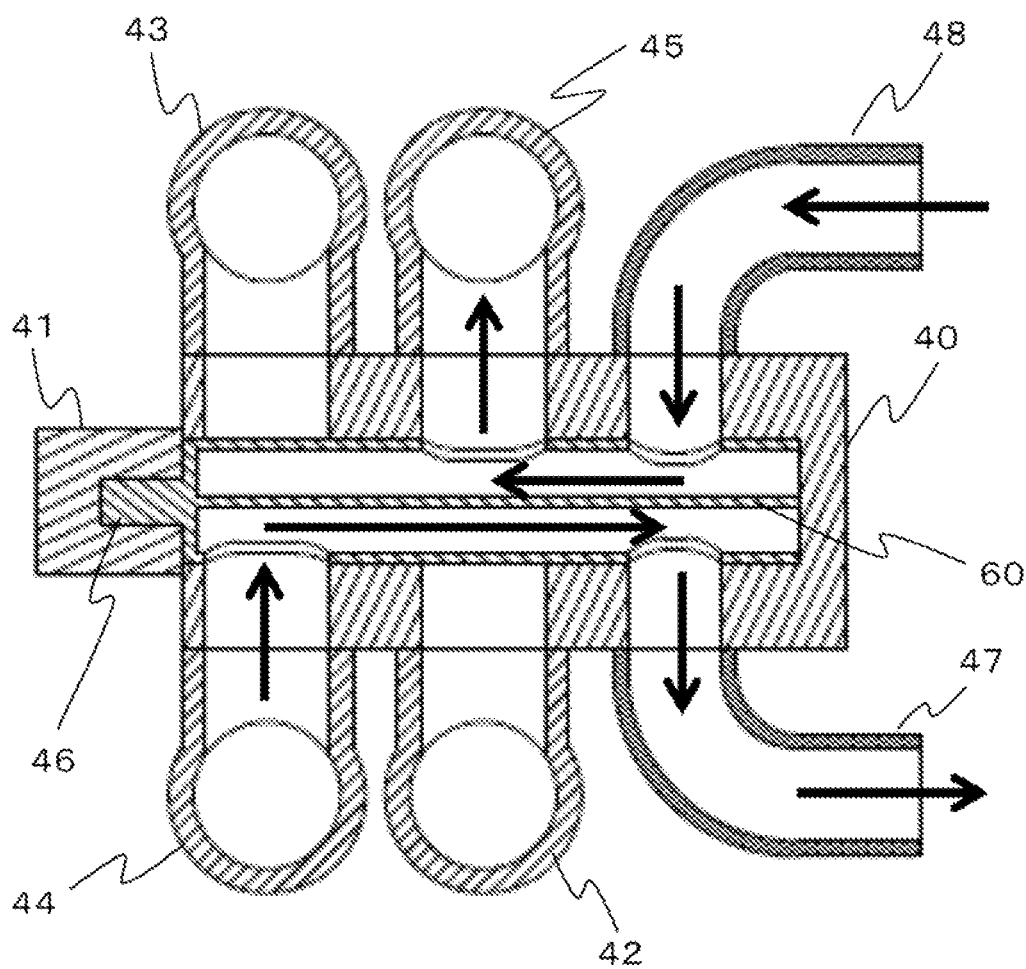
FIG. 11 is a cross-sectional view showing heat medium flows inside the integrated heat-medium flow-path switching device of the air conditioning system according to Embodiment 1 of the present invention, during the heating-dominant operation mode.

FIG. 11 shows a cross-sectional view of the integrated heat-medium flow-path switching device 40 when the heating operation mode of the indoor units 3 (not shown), in which the flow directions of the heat medium are indicated by the solid-line arrows.

In the heating operation mode, the heat medium, after heated by receiving heat from the heat-source side refrigerant through the intermediate heat exchanger 25b (not shown), is pressurized and discharged by the pump 31b (not shown) to be sent to the integrated heat-medium flow-path switching device 40 through the heating-use heat-medium sending main pipe 44. In order to heating-operate the indoor unit 3 (not shown), i.e., to send the heated heat medium to the indoor unit 3, the heat-medium flow-path switching valve 46 provided in the integrated heat-medium flow-path switching device 40 is turned by the drive unit 41 to communicate between the heating-use heat-medium sending main pipe 44 and the sending pipes 47 to indoor unit, and between the heating-use heat-medium returning main pipe 45 and the return pipe 48 from indoor unit by the partition 60. The heat medium flowing in the heating-use heat-medium sending main pipe 44 is thereby passed through the heat-medium flow-path switching valve 46 and sent to the indoor unit 3 through the sending pipe 47 to indoor unit.

The heat medium, after heat-exchanged with the air in the interior spaces through the use-side heat exchange 35 (not shown) in the indoor unit 3 (not shown), flows again into the integrated heat-medium flow-path switching device 40 through the return pipe 48 from indoor unit and returns to the intermediate heat exchanger 25b (not shown) through the heating-use heat-medium returning main pipe 45.

At this time, in the heat-medium flow-path switching valve 46, the heat medium returning from the indoor unit 3 and the heat medium to be sent to the indoor unit 3 are adjacently separated from each other by the partition 60, as shown in FIG. 11.

The heat medium returning to the intermediate heat exchanger 25b (not shown) is heated by receiving heat from the heat-source side refrigerant, and is sent again to the integrated heat-medium flow-path switching device 40 through the heating-use heat-medium sending main pipe 44.

The above is the action of the integrated heat-medium flow-path switching devices 40 and the flows of the heat medium thereinside when the indoor units 3 (not shown) are in the heating operation. During the heating operation, the drive unit 41 for the heat-medium flow-path switching valve 46 control the aperture areas between the heat-medium flow-path switching valve 46 and the heating-use heat-medium sending main pipe 44 (the heating-use heat-medium returning main pipe 45) to adjust the flow rate of the heat medium flowing through the indoor unit 3, so as to keep at target value the difference between the temperature of the heat medium measured with the temperature sensor 55b (not shown) provided in the relay unit 2 (not shown) and temperature of the heat medium measured in the use-side heat exchangers 35 (not shown). The temperatures in the interior spaces are thereby controlled.

[Stop Mode]

Figure 12:
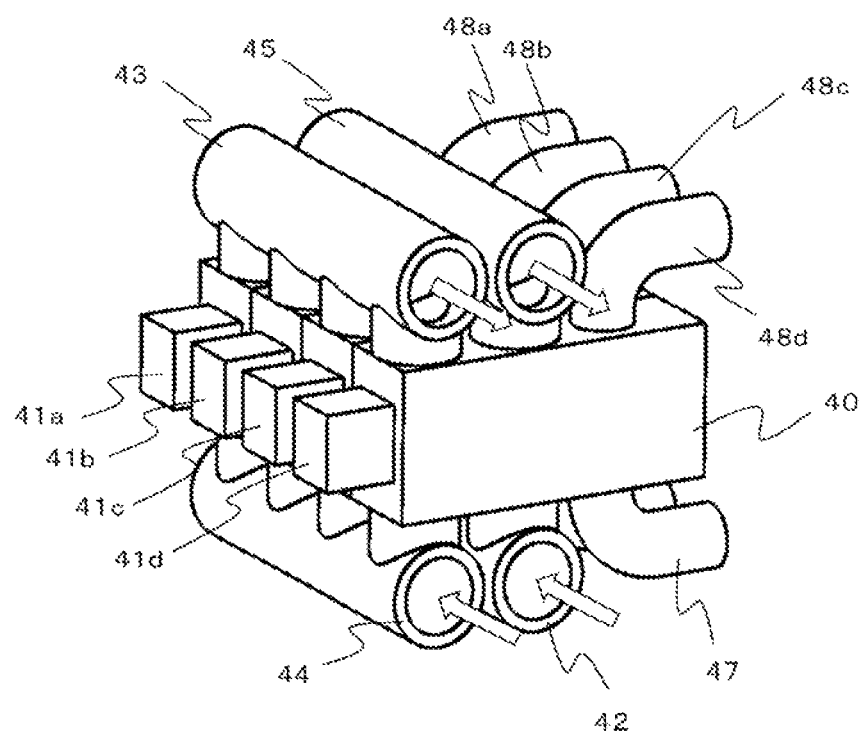
FIG. 12 is a schematic view showing heat medium flows at the integrated heat-medium flow-path switching devices of the air conditioning system according to Embodiment 1 of the present invention, when the flow paths are closed.

FIG. 12 shows a case of an indoor unit 3 (not shown) being in a stop mode, in which the flow directions of the heat medium through the cooling-use heat-medium sending main pipe 42, the cooling-use heat-medium returning main pipe 43, the heating-use heat-medium sending main pipe 44, and the heating-use heat-medium returning main pipe 45 are indicated by the hollow solid-line arrows. In this mode, which is different from the foregoing other operation mode, the heat medium stopped from flowing through the sending pipes 47 to indoor unit and the return pipes 48 from indoor unit.

Figure 13:
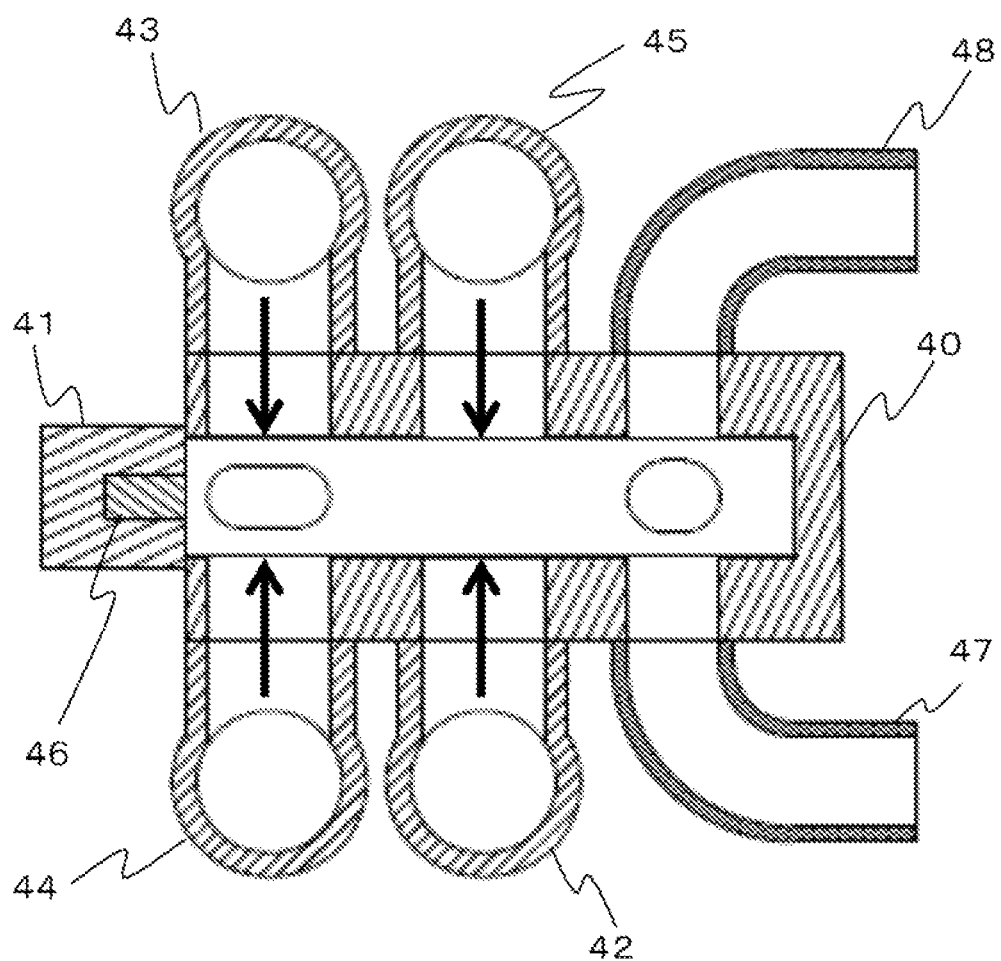
FIG. 13 is a cross-sectional view showing heat medium flows inside the integrated heat-medium flow-path switching device of the air conditioning system according to Embodiment 1 of the present invention, when the flow paths are closed.

FIG. 13 is a cross-sectional view of one of the integrated heat-medium flow-path switching devices 40 when the indoor unit 3 is in the stop mode, in which the flow directions of the heat medium are indicated by the solid-line arrows as with FIG. 11.

In the stop mode, it is necessary for the heat medium neither to be sent to the indoor unit 3 (not shown) nor to be heat-exchanged with the indoor air. To this end, the heat-medium flow-path switching valve 46 in the integrated heat-medium flow-path switching device 40 are put into no aperture state for all of the cooling-use heat-medium sending main pipe 42, the cooling-use heat-medium returning main pipe 43, the heating-use heat-medium sending main pipe 44, and the heating-use heat-medium returning main pipe 45, that is, the heat-medium flow-path switching valve 46 is adjusted to a turn angle intermediate between the cooling operation mode and the heating operation mode.

In this way, the heat medium can be stopped from being sent to specific heat-medium lines 5 (not shown) and to a specific indoor unit 3 among the plurality of indoor units 3 (not shown) connected to the relay unit 2 (not shown) can be stopped.

The above describes the cooling operation mode, the heating operation mode, and the stop mode of the indoor unit 3 (not shown). Since in Embodiment 1, the integrated heat-medium flow-path switching devices 40 are provided for the indoor units 3 on a one-to-one basis, the different operations can be simultaneously performed for individual indoor units.

Thus, in a case of replacing or maintaining parts constituting the heat-medium flow paths in the relay unit 2 (not shown) or even in a further case of replacing one or more of the plurality of indoor units 3 (not shown) connected to the relay unit 2, the maintenance or replacement can be performed while operating the other of the indoor units 3, thus improving efficiency in maintenance or replacement work.

As the heat medium, for example, brine (antifreeze liquid), water, a mixture of brine and water, a mixture of water and high anticorrosive additives, or the like may be used. Thus, in the air conditioning system 100 (not shown), even if the heat medium leaks in the interior spaces 7 (not shown) via the indoor units 3 (not shown), use of a highly safe liquid for the heat medium contributes to improvement of safety.

While Embodiment 1 describes as an example the case of including the accumulator 19 in the air conditioning system 100 as above, the same effect is brought about without providing the accumulator 19. In addition, while in many cases, blowers are typically provided to the heat-source side heat exchanger 12 and the use-side heat exchangers 35 to accelerate condensation or evaporation by the blowing, the acceleration of {condensation and evaporation} is not limited to this. For example, a heat exchanger like a panel heater that utilizes radiation may be used as the use-side heat exchangers 35, and a heat exchanger of water-cooled type that transfer heat by water or the antifreeze liquid may be used as the heat-source side heat exchanger 12. In essence, any type of heat exchanger that has a structure capable of radiating or receiving heat may be used as the use-side heat exchangers 35 and the heat-source side heat exchanger 12.

Moreover, while the second refrigerant flow-path switching devices 28 (not shown) are described as being four-way valves, the second refrigerant flow-path switching devices are not limited to such valves but may be made up of a plurality of two-way valves or three-way valves for the refrigerant to flow through a similar path.

Furthermore, while the drive units 41 are described as being made up of a device such as a stepping motor that is arbitrarily controllable in its turn angle, the drive units is not necessarily made up of such a device but may be made up of, for example, a device, such as like an on-off power source, that is only capable of switching the heat-medium flow path in a case of the flow rate adjustment being unnecessary.

Still furthermore, while the case of four use-side heat exchangers 35 is described as an example, the number thereof is not specifically limited but may be increased if necessary.

Yet furthermore, while the case of two intermediate heat exchangers 25 (not shown) is described as an example, the number of intermediate heat exchangers is not limited to two. Any number of intermediate heat exchangers may be provided as long as they are configured to be able to heat or cool the heat medium. Furthermore, the pumps 31*a*, 31*b* (not shown) each are not limited to one. A plurality of small capacity pumps may be parallel connected.

Still furthermore, while the example of providing the same number of integrated heat-medium flow-path switching devices 40 as that of use-side heat exchangers 35 (not shown) is described, the number of integrated heat-medium flow-path switching devices is not limited to this. The integrated heat-medium flow-path switching devices 40 may be connected with a plurality of use-side heat exchangers 35.

As described above, the air conditioning system 100 according to Embodiment 1 is provided with the integrated heat-medium flow-path switching devices 40 each combine the function of switching the heat medium flow to/from the indoor units 3 and the function of adjusting the heat-medium flow rate, thus bringing about reduction of the number of heat-medium controlling parts (heat-medium flow-path switching part and heat-medium flow-rate adjusting part) and reduction of drive units and various parts such as the heat-medium lines, and fastening parts, whereby the air conditioning system can be made compact and reduced in manufacturing costs. Moreover, the function of switching heat-medium flow to/from the indoor units 3 and the function of adjusting heat-medium flow rate can be simultaneously controlled by the single drive units 41, thus reducing operation power and improving energy saving. Furthermore, the integrated heat-medium flow-path switching devices 40 can close the flow paths for the heat medium not to be sent to the indoor units 3, which are connected to the relay unit 2, being in the stop mode, thus allowing reduction in sending power of the heat medium sending devices, i.e., the pumps 31 and leading to reduction in waste amount of the heat medium during maintenance or replacement of parts, and thereby improving efficiency in maintenance or replacement work.

Embodiment 2

An air conditioning system 200 according to Embodiment 2 of the present invention is described below. A difference between the air conditioning system 200 according to Embodiment 2 and the air conditioning system 100 according to Embodiment 1 lies in the structure of integrated heat-medium flow-path switching devices 40. Since the flow path configuration and the operation modes of the air conditioning system 200 and the action of the integrated heat-medium flow-path switching device are the same as with Embodiment 1, the same or equivalent parts are designated at the same reference numerals and the description thereof is omitted.

Figure 14:
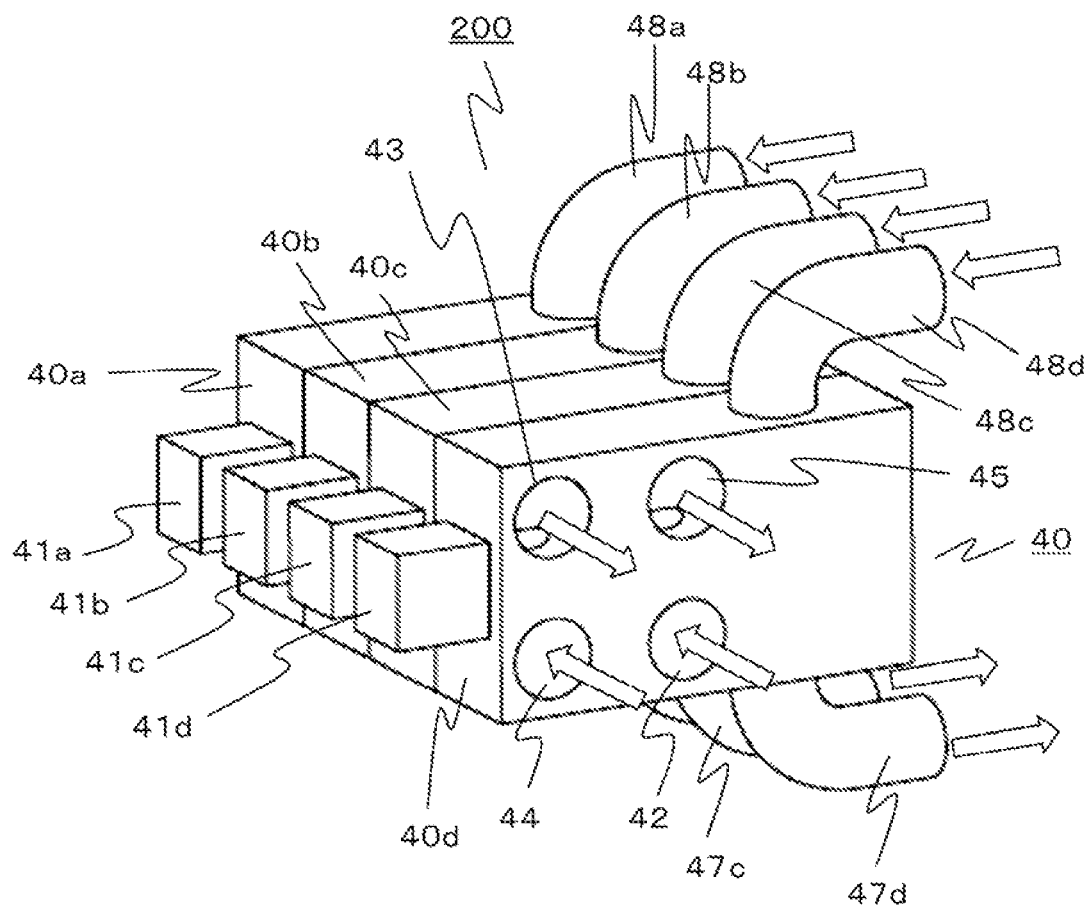
FIG. 14 is a schematic view of integrated heat-medium flow-path switching devices of an air conditioning system according to Embodiment 2 of the present invention.
Figure 15:
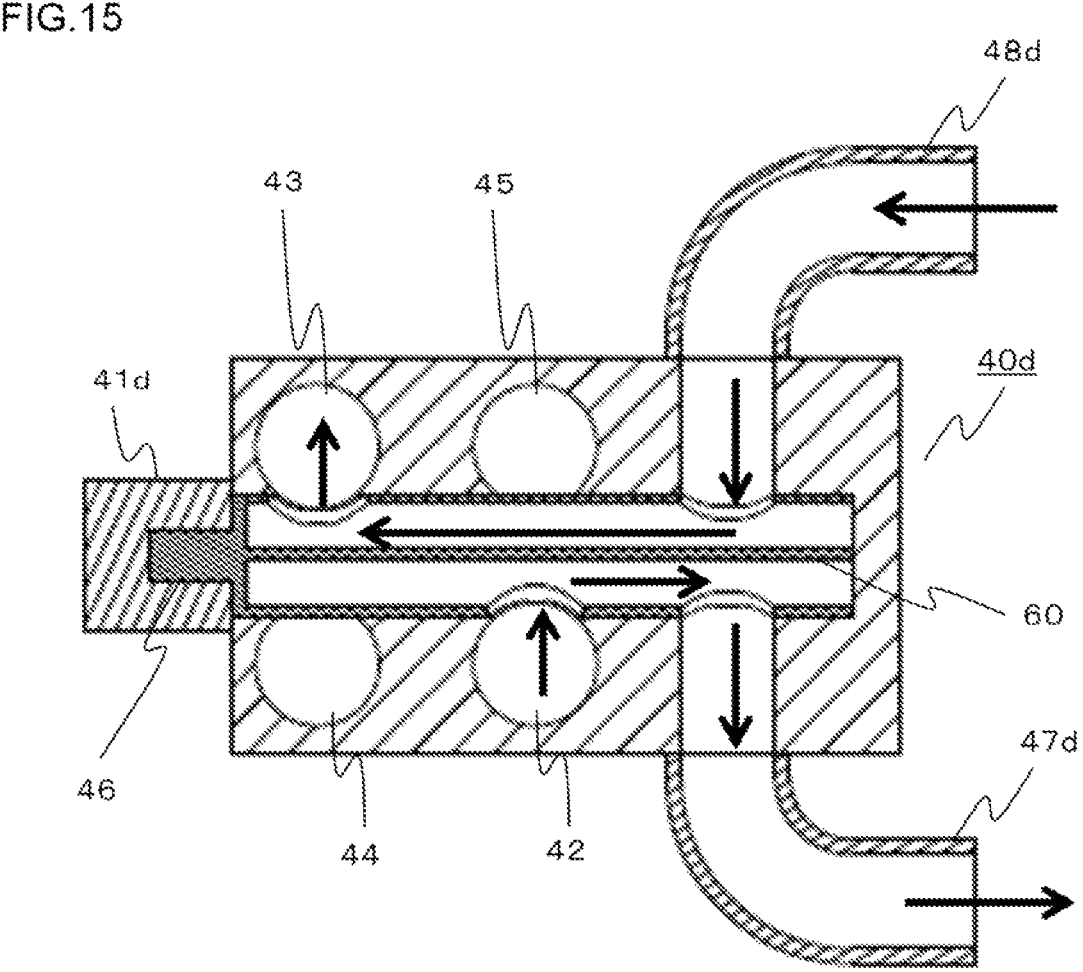
FIG. 15 is a cross-sectional view showing heat medium flow paths inside the integrated heat-medium flow-path switching devices each provided with one drive unit, of the air conditioning system according to Embodiment 2 of the present invention.

FIG. 14 shows a schematic view of the integrated heat-medium flow-path switching devices 40 in a relay unit 2 of an air conditioning system 200 according to Embodiment 2 of the present invention. And FIG. 15 shows a cross-sectional view of the integrated heat-medium flow-path switching device 40*d* provided with one drive unit 41*d*.

As shown in these figures, the integrated heat-medium flow-path switching devices 40*a*, . . . , 40*d* are made up of the drive units 41*a*, . . . , 41*d* on a one-to-one basis, the cooling-use heat-medium sending main pipe 42, the cooling-use heat-medium returning main pipe 43, the heating-use heat-medium sending main pipe 44, the heating-use heat-medium returning main pipe 45, and the others. The cooling-use heat-medium sending main pipe 42, the cooling-use heat-medium returning main pipe 43, the heating-use heat-medium sending main pipe 44, the heating-use heat-medium returning main pipe 45 each are formed adjacently to the heat-medium flow-path switching valves so as to connect therewith.

With this structure, the cooling-use heat-medium sending main pipe 42, the cooling-use heat-medium returning main pipe 43, the heating-use heat-medium sending main pipe 44, the heating-use heat-medium returning main pipe 45 need not be provided separately from the integrated heat-medium flow-path switching devices 40 as with Embodiment 1, thus reducing the number of parts. Moreover, this structure allows the system to be made further compact and its manufacturing costs to be further reduced, compared to Embodiment 1.

Embodiment 3

An air conditioning system 300 according to Embodiment 3 of the present invention is described below. A difference between the air conditioning system 300 according to Embodiment 3 and the air conditioning system 100 according to Embodiment 1 lies in the structures of a cooling-use heat-medium sending main pipe 42, a cooling-use heat-medium returning main pipe 43, a heating-use heat-medium sending main pipe 44, and a heating-use heat-medium returning main pipe 45. Since the flow path configuration and the operation modes of the air conditioning system 300 and the action of the integrated heat-medium flow-path switching device are the same as with Embodiment 1, the same or equivalent parts are designated at the same reference numerals and the description thereof is omitted.

Figure 16:
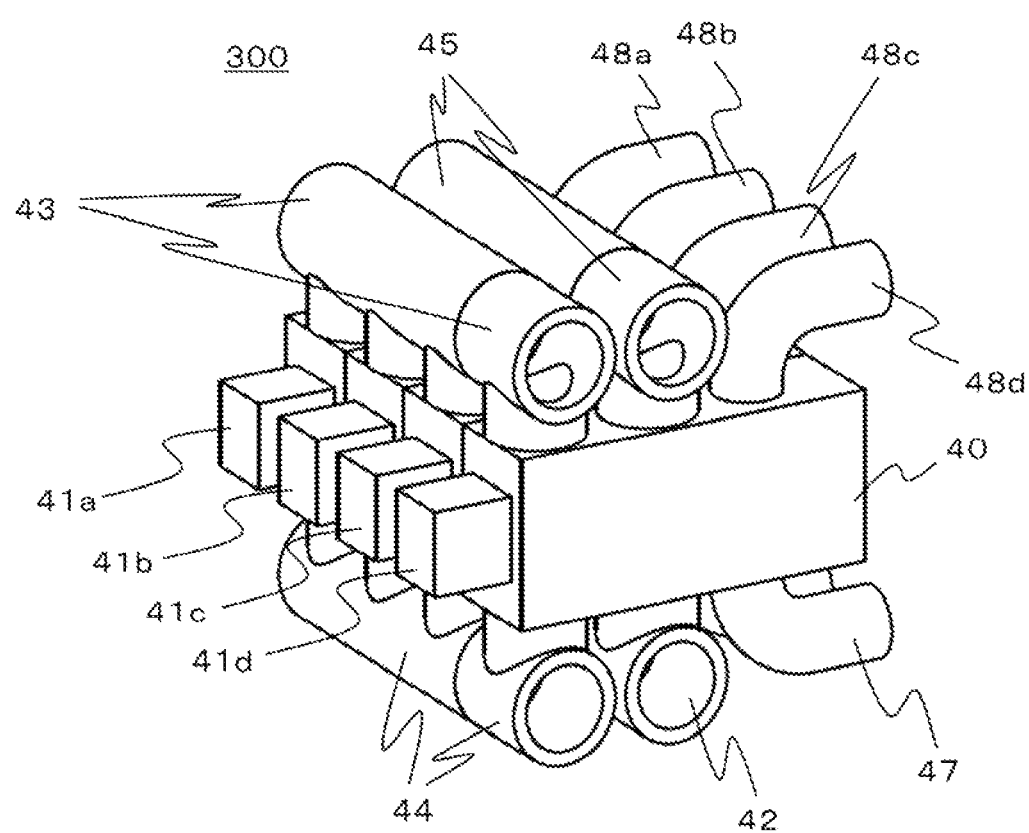
FIG. 16 is a schematic view of integrated heat-medium flow-path switching devices of an air conditioning system according to Embodiment 3 of the present invention.

FIG. 16 shows a schematic view of integrated heat-medium flow-path switching devices 40 in a relay unit 2 of the air conditioning system 300 according to Embodiment 3 of the present invention. The integrated heat-medium flow-path switching devices 40 are characterized to have the cooling-use heat-medium sending main pipe 42, the cooling-use heat-medium returning main pipe 43, the heating-use heat-medium sending main pipe 44, and the heating-use heat-medium returning main pipe 45 each divided in their longitudinal directions.

This allows disassemble to be made more easily than Embodiment 1 at maintenance and replacement of parts. Moreover, this also allows for changing the number of integrated heat-medium flow-path switching devices 40 more easily even when the interior spaces to be air-conditioned is increased or decreased due to renovation or the like of the building 9.

While there is no limitation to the number of integrated heat-medium flow-path switching devices 40 provided for a single set of the cooling-use heat-medium sending main pipe 42, the cooling-use heat-medium returning main pipe 43, the heating-use heat-medium sending main pipe 44, and the heating-use heat-medium returning main pipe 45, one to three heat-medium flow-path switching devices are preferable in light of disassembly thereof. Combining pluralities of cooling-use heat-medium sending main pipes 42, cooling-use heat-medium returning main pipes 43, heating-use heat-medium sending main pipes 44, and heating-use heat-medium returning main pipes 45 allows for freely changing the number of integrated heat-medium flow-path switching devices 40.

It should be noted that each embodiment of the present invention may be freely combined, or may be appropriately modified or omitted within the spirit and the scope of the invention. For example, while the above describes the case of providing the pluralities of narrowing devices, intermediate heat exchangers, and pumps, the present invention can also be applied not only to the case but also to any case in which among these three kinds of constitutional components, any one is single, any two are single, or all are single. Furthermore, while the above describes as an example the case of providing the drive units for the integrated heat-medium flow-path switching devices on a one-to-one basis, the present invention can be applied not only to the case but also to even a case of providing one drive unit for the integrated heat-medium flow-path switching devices as a whole.

LIST OF REFERENCE NUMERALS

1: outdoor unit; 2: relay unit; 3: indoor units; 3a: indoor unit; 3b: indoor unit; 3c: indoor unit; 3d: indoor unit; 4: refrigerant lines; 4a: connection pipe for refrigerant; 4b: connection pipe for refrigerant; 5: heat-medium lines; 6: exterior space; 7: interior spaces; 8: ceiling; 9: building; 10: compressor; 11: first refrigerant flow-path switching device; 12: heat-source side heat exchanger; 13a: check valve; 13b: check valve; 13c: check valve; 13d: check valve; 19: accumulator; 20: bypass line; 25: intermediate heat exchangers; 25a: intermediate heat exchanger; 25b: intermediate heat exchanger; 26: narrowing devices; 26a: narrowing device; 26b: narrowing device; 27: opening/closing device; 28: second refrigerant flow-path switching devices; 28a: second refrigerant flow-path switching device; 28b: second refrigerant flow-path switching device; 29: opening/closing device; 31: pumps; 31a: pump; 31b: pump; 32: first heat-medium flow-path switching devices; 32a: first heat-medium flow-path switching device; 32b: first heat-medium flow-path switching device; 32c: first heat-medium flow-path switching device; 32d: first heat-medium flow-path switching device; 33: second heat-medium flow-path switching devices; 33a: second heat-medium flow-path switching device; 33b: second heat-medium flow-path switching device; 33c: second heat-medium flow-path switching device; 33d: second heat-medium flow-path switching device; 35: use-side heat exchangers; 35a: use-side heat exchanger; 35b: use-side heat exchanger; 35c: use-side heat exchanger; 35d: use-side heat exchanger; 40: integrated heat-medium flow-path switching devices; 41: drive units; 42: cooling-use heat-medium sending main pipe; 43: cooling-use heat-medium returning main pipe; 44: heating-use heat-medium sending main pipe; 45: heating-use heat-medium returning main pipe; 46: heat-medium flow-path switching valves; 47: sending pipe(s) to indoor unit; 48: return pipe(s) from indoor unit; 50: controller; 55: temperature sensors; 55a: temperature sensor; 55b: temperature sensor; 60: partition(s); 100, 200, 300: air conditioning system; A: refrigerant circulating path network; and B: heat-medium circulating path network.

The invention claimed is:

1. An air conditioning system comprising:
a refrigerant circulating path network connecting, with refrigerant lines, a compressor; a heat-source side heat exchanger for evaporating and gasifying or condensing and liquefying a heat-source side refrigerant; expansion valves for controlling a flow rate of the refrigerant; refrigerant pipes in intermediate heat exchangers for exchanging heat between the heat-source side refrigerant and a use-side heat medium; and a four-way valve, a plurality of two-way valves or a plurality of three-way valves for switching a circulation path of the refrigerant, for circulating the heat-source side refrigerant; and
a heat medium circulating path network connecting, with heat-medium lines, pumps for pressurizing and sending the heat medium; use-side heat exchangers for exchanging heat between the heat medium with air in interior spaces to be air conditioned; and heat-medium pipes in the intermediate heat exchangers, for circulating the heat medium,
wherein
temperatures in the interior spaces to be air conditioned are controlled by exchanging heat, through the use-side heat exchangers, between the air in the interior spaces to be air-conditioned and the heat medium heated or cooled by the heat-source side refrigerant in the intermediate heat exchangers,
the air conditioning system further comprising:
integrated heat-medium flow-path switching devices connectedly interposed between the intermediate heat exchangers and the use-side heat exchangers, each integrated heat-medium flow-path switching device including thereinside:
a heat-medium flow-path switching valve having holes formed in its sidewall and having a longitudinal inner partition, a first end and a second end opposite the first end, the longitudinal inner partition extending from the first end to the second end,
wherein the heat-medium flow-path switching valve is revolved to select either of the heated heat medium or the cooled heat medium for it to flow between the intermediate heat exchangers and the use-side heat exchangers, whereby air conditioning is performed.

2. The air conditioning system of claim 1, wherein in a case of providing the plurality of use-side heat exchangers, the same or less number of integrated heat-medium flow-path switching devices as or than the number of use-side heat exchangers are provided to perform a heating only operation mode in which all intermediate heat exchangers act as condensers, a cooling only operation mode in which all intermediate heat exchangers act as evaporators, and a cooling and heating mixed operation mode in which part of the intermediate heat exchangers act as a condenser and the other part of the intermediate heat exchangers act as an evaporator.

3. The air conditioning system of claim 2, wherein flow rates of the heat medium flowing between the intermediate heat exchangers and the use-side heat exchangers are controlled during each operation mode.

4. The air conditioning system of claim 3, wherein switching between the heated heat medium and cooled the heat medium as well as adjusting the flow rates of the heat medium are performed by single drive units provided in the integrated heat-medium flow-path switching devices so as to keep at target values the differences between temperatures measured with temperature sensors provided to the intermediate heat exchangers and temperatures of the heat medium at the use-side heat exchangers.

5. The air conditioning system of claim 3, wherein in each operation mode, heat-medium flow paths between the intermediate heat exchangers and the use-side heat exchangers are closed by controlling part of or all of the drive units in the plurality of integrated heat-medium flow-path switching devices to close the flow paths.

6. The air conditioning system of claim 1, wherein the refrigerant with which the refrigerant circulating path network is charged is a single refrigerant, a near-azeotropic refrigerant mixture, a non-azeotropic refrigerant mixture, or a natural refrigerant that is changeable to a two-phase state or a supercritical state.

7. The air conditioning system of claim 1, wherein the heat medium with which the heat-medium circulating path network is filled is an antifreeze liquid or a mixture of water and an additive having a high anti-corrosion effect.

8. The air conditioning system of claim 1, wherein the flow paths of the heat medium are formed by configuring integrated heat-medium flow-path switching devices such that part of flow paths of at least one of the heated heat medium and the cooled heat medium are connectedly formed in the integrated heat-medium flow-path switching devices.

9. The air conditioning system of claim 1, wherein the flow paths of the heat medium are formed by joining pipes that are connected to the integrated heat-medium flow-path switching device(s) and through which at least one of the heated heat medium and the cooled heat medium is passed, to allow the number of integrated heat-medium flow-path switching devices to be changeable.

* * * * *